United States Patent
Shiba et al.

(10) Patent No.: US 7,274,729 B2
(45) Date of Patent: *Sep. 25, 2007

(54) SPREAD SPECTRUM COMMUNICATION DEVICE AND COMMUNICATION SYSTEM

(75) Inventors: Takashi Shiba, Yokosuka (JP); Akitsuna Yuhara, Tokyo (JP); Yoshihiro Yamada, Yokohama (JP); Yasuhiro Ohta, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 698 days.

This patent is subject to a terminal disclaimer.

(21) Appl. No.: 10/730,003

(22) Filed: Dec. 9, 2003

(65) Prior Publication Data

US 2004/0120388 A1   Jun. 24, 2004

Related U.S. Application Data

(63) Continuation of application No. 09/558,373, filed on Apr. 26, 2000, now Pat. No. 6,697,418, which is a continuation of application No. 08/875,182, filed on Jul. 21, 1997, now Pat. No. 6,134,264.

(51) Int. Cl.
*H04B 1/707* (2006.01)
(52) U.S. Cl. ............... 375/152; 375/150; 375/151; 375/153; 375/143; 310/313; 310/359; 333/150; 342/195; 370/342
(58) Field of Classification Search ............... 375/150, 375/151, 152, 153, 343, 200, 206, 207, 208, 375/209, 346, 142, 143; 333/150; 342/195; 310/313, 359; 370/342
See application file for complete search history.

(56) References Cited

U.S. PATENT DOCUMENTS 4,095,225 A   6/1978   Erikmats ............... 342/195

(Continued)

FOREIGN PATENT DOCUMENTS

JP   57199355   12/1982

(Continued)

OTHER PUBLICATIONS

S. Minagawa, et al, "Sezawa Wave Correlator Using Monolithic ZnO/SiO2/Si Structure" Proceedings of IEEE 1984 Ultrasonics Symposium, pp. 298-302, Dallas, TX.

(Continued)

*Primary Examiner*—Chieh M. Fan
*Assistant Examiner*—Siu M Lee
(74) *Attorney, Agent, or Firm*—Mattingly, Stanger, Malur & Brundidge, P.C.

(57) ABSTRACT

A structure of a spectrum spreading communication device which solves the problem with the conventional spectrum spreading communication using Barker codes, etc., and limits the rise of the side-lobe of a correctional signal independently of the order of information codes by use of a code sequence having a code length of at least 14. The spectrum spreading communication device uses a pseudo-noise code having code length of at least 14 and a self-correlation side-lobe of not greater than 3 as a pseudo-noise code of a direct spreading communication device which uses the pseudo-noise codes whose polarities are inverted so as to deal with also digital information. Thus, even when the pseudo-noise code length is 14 or more, the side-lobe of the correction coefficient can be restricted. Accordingly, the error rate of the spectrum spreading communication device is reduced and the processing gain is improved.

11 Claims, 13 Drawing Sheets

U.S. PATENT DOCUMENTS

| | | | | |
|---|---|---|---|---|
| 5,073,898 | A | * 12/1991 | Endo et al. | 375/151 |
| 5,144,639 | A | 9/1992 | Uchida et al. | 375/208 |
| 5,179,574 | A | * 1/1993 | Watanabe et al. | 375/376 |
| 5,218,620 | A | 6/1993 | Mori et al. | 375/142 |
| 5,294,858 | A | 3/1994 | Nakahata et al. | 310/313 A |
| 5,353,304 | A | * 10/1994 | Mochizuki | 375/151 |
| 5,375,141 | A | 12/1994 | Takahashi | 375/208 |
| 5,381,444 | A | 1/1995 | Tajima | 375/200 |
| 5,488,629 | A | 1/1996 | Takahashi et al. | 375/206 |
| 5,499,265 | A | 3/1996 | Dixon et al. | 375/200 |
| 5,530,697 | A | 6/1996 | Watanabe | 370/342 |
| 5,576,590 | A | 11/1996 | Ohnishi et al. | 310/359 |
| 5,646,964 | A | 7/1997 | Ushirokawa et al. | 375/346 |
| 6,134,264 | A | 10/2000 | Shiba et al. | |
| 6,697,418 | B1 | * 2/2004 | Shiba et al. | 375/150 |

FOREIGN PATENT DOCUMENTS

| | | |
|---|---|---|
| JP | 59104841 | 6/1984 |
| JP | 3174835 | 7/1991 |
| JP | 05145520 | 6/1993 |
| JP | 05252141 | 9/1993 |

OTHER PUBLICATIONS

Niitsuma, et al, "Development of Zero-Bias and Surface Mounting ZnO/Si/ SAW Convolvers" Technical Report of IEICE, SST93-44.

J. Gau, et al, SAW Barker Code Correlator with Improved Sidelobes, IEEE 1985 Ultrasonics Symposium, pp. 145-145.

T. Shiba, "Low Insertion Loss Surface Acoustic Wave Matched Filter with Low Sidelobe Sequence and its Application for Spread Spectrum Communication" JPN, J. Appl. Phys. vol. 35, Part 1, No. 5B, (May 1996), pp. 3024-3027.

T. Shiba, "Low Loss Saw Matched Filters with Low Sidelobe Sequences and Spread Spectrum Application", Multimedia Systems R&D Division, Research Institute of Electrical Communication, ISSSTA, 1996.

* cited by examiner

SIGNAL CODE SEQUENCE

D/U=8.1 (18.2dB)

D/U=13 (22.1dB)

D/U=9.8 (19.8dB)

D/U=16.5 (24.4dB)

SPREAD SPECTRUM COMMUNICATION DEVICE AND COMMUNICATION SYSTEM

The present application is a continuation of application Ser. No. 09/558,373, filed Apr. 26, 2000 now U.S. Pat. No. 6,697,418; which is a continuation of application Ser. No. 08/875,182, filed Jul. 21, 1997, now U.S. Pat. No. 6,134,264, the contents of which are incorporated herein by reference.

BACKGROUND OF THE INVENTION

The present invention relates to surface acoustic wave devices and communication devices.

In conventional spread spectrum communication devices using the direct spreading method, a Barker code was used as a pseudo noise code as described in 1985 ULTRASONICS SYMPOSIUM proceedings, pp. 145-148, for example. It is known that this code does not depend on the arrangement of an information code sequence and this code has an auto-correlation side lobe of 1.

The Barker code has been found with the code length of 13 or less. The Barker code has not been found with a code length exceeding it. In the case where a processing gain of a code length of at least 14 was required, therefore, a code other than the Barker code, such as the longest code sequence was used. In these code sequences, however, a large side lobe rise is caused when the sign of the information code is inverted. In general, therefore, the error rate is increased.

An object of the present invention is to solve the above described problem and provide a novel structure of a spread spectrum communication device which uses a code sequence having a code length of at least 14, which does not depend on the arrangement of the information code, and which suppresses the side lobe rise of correlation signals.

SUMMARY OF THE INVENTION

The above described object can be achieved by employing a code sequence used by the present invention, i.e., a code shown in TABLES 1 through 9 as the pseudo noise code for spreading the power density spectrum of an input signal.

It has been confirmed by calculation conducted by the present inventors that the code shown in TABLES 1 through 9 has an auto-correlation coefficient side lobe of 3 or less. If this code is used, therefore, there is obtained a novel spread spectrum communication device and communication system which has a processing gain having an auto-correlation coefficient side lobe of at least 14, which does not depend on the arrangement of the information code, which suppresses the side lobe rise of the correlation signal, and which makes the error rate small. In addition, a surface acoustic wave device utilizing this characteristic is obtained.

The present invention relates to a novel code having a processing gain with a code length of at least 14 and an auto-correlation side lobe of 3 or less. The code length is determined in some cases by using harmonics of the crystal (oscillation frequency in the case where a frequency multiplier is used). In other cases, the code length is generated independently of the clock frequency of the baseband digital circuit.

It is now assumed that the code length is determined by using harmonics of the crystal. If harmonics are generated by distorting the oscillation waveform of the clock frequency in order to make harmonic components large, for example, only odd-number components included in harmonic components are typically generated. If its odd-number components are used as the clock of pseudo noise code generator, therefore, a value obtained by dividing the clock of the pseudo noise code generator by the clock frequency of the baseband digital circuit, i.e., the code length is obtained. To be concrete, an odd-numbered code length such as 15, 17, 19, . . . is obtained.

In the case where the obtained odd-numbered code length is applied to a spread spectrum communication-device, two code lengths are combined and used in some cases. To be concrete, it is a result of multiplication of odd-numbered code lengths. A value of at least 14 such as 15, 21, 25, 27, . . . is used as the code length.

In the case where the code length is generated independently of the clock frequency of the baseband digital circuit, it doesn't matter at all whether the code length is even-numbered or odd-numbered and consequently values of at least 14, i.e., values 14, 15, 16, 17, . . . are obtained.

In either case, a pseudo noise code formed by a large number of combinations in respective code lengths is present. Out of them, the present inventors found a novel code which is 3 or less in auto-correlation side lobe and which is effective as the pseudo noise code used for spreading the power density spectrum of an input signal. The present inventors also found a novel pseudo noise generator capable of executing spreading (or de-spreading) of the power density spectrum of an input signal by using those codes.

The following TABLES 1 through 9 show the pseudo noise code concerning the present invention.

TABLE 1

| | (n = 14) | | | |
|---|---|---|---|---|
| number | bj | max. corr. (forward) | max. corr. (back) | dc level |
| 202 | 00000011001010 | 2 | 6 | −6 |
| 332 | 00000101001100 | 2 | 6 | −6 |
| 404 | 00000110010100 | 2 | 8 | −6 |
| 405 | 00000110010101 | 2 | 6 | −4 |
| 410 | 00000110011010 | 2 | 10 | −4 |
| 470 | 00000111010110 | 2 | 10 | −2 |
| 665 | 00001010011001 | 2 | 10 | −4 |
| 691 | 00001010110011 | 2 | 10 | −2 |
| 811 | 00001100101011 | 2 | 10 | −2 |
| 821 | 00001100110101 | 2 | 10 | −2 |
| 1883 | 00011101011011 | 2 | 10 | 2 |
| 2375 | 00100101000111 | 2 | 10 | −2 |
| 2656 | 00101001100000 | 2 | 8 | −6 |
| 2767 | 00101011001111 | 2 | 10 | 2 |
| 3232 | 00110010100000 | 2 | 6 | −6 |
| 3247 | 00110010101111 | 2 | 10 | 2 |
| 3322 | 00110011111010 | 2 | 10 | 2 |
| 4021 | 00111110110101 | 2 | 10 | 4 |
| 4622 | 01001000001110 | 2 | 10 | −4 |
| 5145 | 01010000011001 | 2 | 6 | −4 |
| 5251 | 01010010000011 | 2 | 10 | −4 |
| 5312 | 01010011000000 | 2 | 6 | −6 |
| 5313 | 01010011000001 | 2 | 8 | −4 |
| 5327 | 01010011001111 | 2 | 10 | 2 |
| 5535 | 01010110011111 | 2 | 6 | 4 |
| 5728 | 01011001100000 | 2 | 10 | −4 |
| 5758 | 01011001111110 | 2 | 10 | 4 |
| 6092 | 01011111001100 | 2 | 10 | 2 |
| 6118 | 01011111100110 | 2 | 10 | 4 |
| 6575 | 01100110101111 | 2 | 10 | 4 |
| 6645 | 01100111110101 | 2 | 6 | 4 |
| 6650 | 01100111111010 | 2 | 10 | 4 |
| 6880 | 01101011100000 | 2 | 10 | −2 |
| 7186 | 01110000010010 | 2 | 10 | −4 |
| 7989 | 01111100110101 | 2 | 8 | 4 |
| 8090 | 01111110011010 | 2 | 10 | 4 |

TABLE 1-continued (n = 14)

| number | bj | max. corr. (forward) | max. corr. (back) | dc level |
|---|---|---|---|---|
| 8293 | 10000001100101 | 2 | 10 | −4 |
| 8394 | 10000011001010 | 2 | 8 | −4 |
| 9197 | 10001111101101 | 2 | 10 | 4 |
| 9503 | 10010100011111 | 2 | 10 | 2 |
| 9733 | 10011000000101 | 2 | 10 | −4 |
| 9738 | 10011000001010 | 2 | 6 | −4 |
| 9808 | 10011001010000 | 2 | 10 | −4 |
| 10265 | 10100000011001 | 2 | 10 | −4 |
| 10291 | 10100000110011 | 2 | 10 | −2 |
| 10625 | 10100110000001 | 2 | 10 | −4 |
| 10655 | 10100110011111 | 2 | 10 | 4 |
| 10848 | 10101001100000 | 2 | 6 | −4 |
| 11056 | 10101100110000 | 2 | 10 | −2 |
| 11070 | 10101100111110 | 2 | 8 | 4 |
| 11071 | 10101100111111 | 2 | 6 | 6 |
| 11132 | 10101101111100 | 2 | 10 | 4 |
| 11238 | 10101111100110 | 2 | 6 | 4 |
| 11761 | 10110111110001 | 2 | 10 | 4 |
| 12362 | 11000010001010 | 2 | 10 | −4 |
| 13061 | 11001100000101 | 2 | 10 | −2 |
| 13136 | 11001101010000 | 2 | 10 | −2 |
| 13151 | 11001101011111 | 2 | 6 | 6 |
| 13616 | 11010100110000 | 2 | 10 | −2 |
| 13727 | 11010110011111 | 2 | 8 | 6 |
| 14008 | 11011010111000 | 2 | 10 | 2 |
| 14500 | 11100010100100 | 2 | 10 | −2 |
| 15562 | 11110011001010 | 2 | 10 | 2 |
| 15572 | 11110011010100 | 2 | 10 | 2 |
| 15692 | 11110101001100 | 2 | 10 | 2 |
| 15718 | 11110101100110 | 2 | 10 | 4 |
| 15913 | 11111000101001 | 2 | 10 | 2 |
| 15973 | 11111001100101 | 2 | 10 | 4 |
| 15978 | 11111001101010 | 2 | 6 | 4 |
| 15979 | 11111001101011 | 2 | 8 | 6 |
| 16051 | 11111010110011 | 2 | 6 | 6 |
| 16181 | 11111100110101 | 2 | 6 | 6 |

TABLE 2

(n = 15)

| number | bj | max. corr. (forward) | max. corr. (back) | dc level |
|---|---|---|---|---|
| 202 | 000000011001010 | 3 | 7 | −7 |
| 332 | 000000101001010 | 3 | 7 | −7 |
| 345 | 000000101011001 | 3 | 7 | −5 |
| 394 | 000000110001010 | 3 | 7 | −7 |
| 404 | 000000110010100 | 3 | 9 | −7 |
| 405 | 000000110010101 | 3 | 7 | −5 |
| 410 | 000000110011010 | 3 | 11 | −5 |
| 618 | 000001001101010 | 3 | 7 | −5 |
| 652 | 000001010001100 | 3 | 11 | −7 |
| 664 | 000001010011000 | 3 | 11 | −7 |
| 665 | 000001010011001 | 3 | 11 | −5 |
| 678 | 000001010100110 | 3 | 7 | −5 |
| 691 | 000001010110011 | 3 | 7 | −3 |
| 710 | 000001011001010 | 3 | 11 | −5 |
| 718 | 000001011001110 | 3 | 7 | −3 |
| 808 | 000001100101000 | 3 | 11 | −7 |
| 809 | 000001100101001 | 3 | 11 | −5 |
| 810 | 000001100101010 | 3 | 7 | −5 |
| 811 | 000001100101011 | 3 | 9 | −3 |
| 821 | 000001100110101 | 3 | 7 | −3 |
| 922 | 000001110011010 | 3 | 11 | −3 |
| 1140 | 000010001110100 | 3 | 11 | −5 |
| 1221 | 000010011000101 | 3 | 11 | −5 |
| 1299 | 000010100010011 | 3 | 11 | −5 |
| 1305 | 000010100011001 | 3 | 11 | −5 |
| 1356 | 000010101001100 | 3 | 11 | −5 |
| 1380 | 000010101100100 | 3 | 11 | −5 |

TABLE 2-continued (n = 15)

| number | bj | max. corr. (forward) | max. corr. (back) | dc level |
|---|---|---|---|---|
| 1610 | 000011001001010 | 3 | 11 | −5 |
| 1620 | 000011001010100 | 3 | 11 | −5 |
| 1642 | 000011001101010 | 3 | 11 | −3 |
| 1672 | 000011010001000 | 3 | 11 | −7 |
| 2152 | 000100001101000 | 3 | 11 | −7 |
| 2224 | 000100010110000 | 3 | 11 | −7 |
| 2228 | 000100010110100 | 3 | 11 | −5 |
| 2281 | 000100011101001 | 3 | 11 | −3 |
| 2579 | 000101000010011 | 3 | 11 | −5 |
| 2587 | 000101000011011 | 3 | 11 | −3 |
| 2656 | 000101001100000 | 3 | 11 | −7 |
| 2824 | 000101100001000 | 3 | 11 | −7 |
| 3232 | 000110010100000 | 3 | 11 | −7 |
| 3748 | 000111010100100 | 3 | 9 | −3 |
| 3821 | 000111011101101 | 3 | 9 | 3 |
| 4188 | 001000001011100 | 3 | 11 | −5 |
| 4305 | 001000011010001 | 3 | 11 | −5 |
| 4419 | 001000101000011 | 3 | 11 | −5 |
| 4449 | 001000110100001 | 3 | 11 | −5 |
| 4792 | 001001010111000 | 3 | 9 | −3 |
| 4874 | 001001100001010 | 3 | 7 | −5 |
| 4944 | 001001101010000 | 3 | 11 | −5 |
| 5079 | 001001111010111 | 3 | 11 | 3 |
| 5139 | 001010000010011 | 3 | 11 | −5 |
| 5145 | 001010000011001 | 3 | 11 | −5 |
| 5312 | 001010011000000 | 3 | 9 | −7 |
| 5313 | 001010011000001 | 3 | 11 | −5 |
| 5424 | 001010100110000 | 3 | 11 | −5 |
| 5535 | 001010110011111 | 3 | 9 | 3 |
| 5619 | 001010111110011 | 3 | 11 | 3 |
| 5649 | 001011000010001 | 3 | 11 | −5 |
| 5768 | 001011010001000 | 3 | 11 | −5 |
| 5904 | 001011100010000 | 3 | 11 | −5 |
| 6154 | 001100000001010 | 3 | 7 | −7 |
| 6165 | 001100000010101 | 3 | 7 | −5 |
| 6187 | 001100000101011 | 3 | 11 | −3 |
| 6304 | 001100010100000 | 3 | 11 | −7 |
| 6405 | 001100100000101 | 3 | 11 | −5 |
| 6464 | 001100101000000 | 3 | 7 | −7 |
| 6465 | 001100101000001 | 3 | 11 | −5 |
| 6480 | 001100101010000 | 3 | 11 | −5 |
| 6495 | 001100101011111 | 3 | 7 | 3 |
| 6645 | 001100111110101 | 3 | 11 | 3 |
| 6922 | 001101100001010 | 3 | 11 | −3 |
| 7087 | 001101110101111 | 3 | 11 | 5 |
| 7127 | 001101111010111 | 3 | 11 | 5 |
| 7147 | 001101111101011 | 3 | 11 | 5 |
| 7428 | 001110100000100 | 3 | 11 | −5 |
| 7867 | 001111010111011 | 3 | 11 | 5 |
| 7901 | 001111011011101 | 3 | 11 | 5 |
| 7989 | 001111100110101 | 3 | 11 | 3 |
| 8369 | 010000010110001 | 3 | 11 | −5 |
| 8377 | 010000010111001 | 3 | 11 | −3 |
| 8394 | 010000011001010 | 3 | 11 | −5 |
| 8610 | 010000110100010 | 3 | 11 | −5 |
| 8730 | 010001000011010 | 3 | 11 | −5 |
| 8734 | 010001000011110 | 3 | 11 | −3 |
| 8771 | 010001001000011 | 3 | 11 | −5 |
| 8898 | 010001101000010 | 3 | 11 | −5 |
| 9230 | 010010000001110 | 3 | 9 | −5 |
| 9287 | 010010001000111 | 3 | 9 | −3 |
| 9738 | 010011000001010 | 3 | 11 | −5 |
| 10252 | 010100000001100 | 3 | 7 | −7 |
| 10265 | 010100000011001 | 3 | 7 | −5 |
| 10278 | 010100000100110 | 3 | 11 | −5 |
| 10290 | 010100000110010 | 3 | 11 | −5 |
| 10291 | 010100000110011 | 3 | 11 | −3 |
| 10340 | 010100001100100 | 3 | 7 | −5 |
| 10348 | 010100001101100 | 3 | 11 | −3 |
| 10432 | 010100011000000 | 3 | 7 | −7 |
| 10544 | 010100100110000 | 3 | 11 | −5 |
| 10624 | 010100110000000 | 3 | 7 | −7 |
| 10625 | 010100110000001 | 3 | 7 | −7 |
| 10626 | 010100110000010 | 3 | 11 | −5 |

TABLE 2-continued (n = 15)

| number | bj | max. corr. (forward) | max. corr. (back) | dc level |
|---|---|---|---|---|
| 10627 | 010100110000011 | 3 | 11 | −3 |
| 10655 | 010100110011111 | 3 | 7 | 3 |
| 10848 | 010101001100000 | 3 | 7 | −5 |
| 11040 | 010101100100000 | 3 | 7 | −5 |
| 11056 | 010101100110000 | 3 | 11 | −3 |
| 11070 | 010101100111110 | 3 | 9 | 3 |
| 11071 | 010101100111111 | 3 | 7 | 5 |
| 11238 | 010101111100110 | 3 | 7 | 3 |
| 11251 | 010101111110011 | 3 | 7 | 5 |
| 11298 | 010110000100010 | 3 | 11 | −5 |
| 11456 | 010110011000000 | 3 | 11 | −5 |
| 11488 | 010110011100000 | 3 | 11 | −3 |
| 11518 | 010110011111110 | 3 | 11 | 5 |
| 11887 | 010111001101111 | 3 | 11 | 5 |
| 11998 | 010111011011111 | 3 | 11 | 5 |
| 12211 | 010111110110011 | 3 | 11 | 5 |
| 12217 | 010111110111001 | 3 | 11 | 5 |
| 12238 | 010111111001110 | 3 | 11 | 5 |
| 12262 | 010111111100110 | 3 | 11 | 5 |
| 12549 | 011000100000101 | 3 | 11 | −5 |
| 12609 | 011000101000001 | 3 | 11 | −5 |
| 12669 | 011000101111101 | 3 | 11 | 3 |
| 12704 | 011000110100000 | 3 | 11 | −5 |
| 12810 | 011001000001010 | 3 | 11 | −5 |
| 12929 | 011001010000001 | 3 | 11 | −5 |
| 12960 | 011001010100000 | 3 | 7 | −5 |
| 12991 | 011001010111111 | 3 | 7 | 5 |
| 13151 | 011001101011111 | 3 | 11 | 5 |
| 13231 | 011001110101111 | 3 | 11 | 5 |
| 13290 | 011001111101010 | 3 | 7 | 3 |
| 13291 | 011001111101011 | 3 | 11 | 5 |
| 13301 | 011001111110101 | 3 | 7 | 5 |
| 13306 | 011001111111010 | 3 | 11 | 5 |
| 13329 | 011010000010001 | 3 | 11 | −5 |
| 13431 | 011010001110111 | 3 | 11 | 3 |
| 13727 | 011010110011111 | 3 | 11 | 5 |
| 14254 | 011011110101110 | 3 | 11 | 5 |
| 14354 | 011100000010010 | 3 | 9 | −5 |
| 14717 | 011100101111101 | 3 | 11 | 5 |
| 14752 | 011100110100000 | 3 | 7 | −3 |
| 14842 | 011100111111010 | 3 | 11 | 5 |
| 14971 | 011101001111011 | 3 | 11 | 5 |
| 15094 | 011101011110110 | 3 | 11 | 5 |
| 15307 | 011101111001011 | 3 | 11 | 5 |
| 15337 | 011101111101001 | 3 | 11 | 5 |
| 15394 | 011110000100010 | 3 | 11 | −3 |
| 15547 | 011110010111011 | 3 | 11 | 5 |
| 15802 | 011110110111010 | 3 | 11 | 5 |
| 15978 | 011111001101010 | 3 | 9 | 3 |
| 15979 | 011111001101011 | 3 | 11 | 5 |
| 16051 | 011111010110011 | 3 | 11 | 5 |
| 16057 | 011111010111001 | 3 | 11 | 5 |
| 16181 | 011111100110101 | 3 | 9 | 5 |
| 16217 | 011111101011001 | 3 | 11 | 5 |
| 16282 | 011111110011010 | 3 | 11 | 5 |
| 16485 | 100000001100101 | 3 | 11 | −5 |
| 16550 | 100000010100101 | 3 | 11 | −5 |
| 16586 | 100000011001010 | 3 | 9 | −5 |
| 16710 | 100000101000110 | 3 | 11 | −5 |
| 16716 | 100000101001100 | 3 | 11 | −5 |
| 16788 | 100000110100000 | 3 | 11 | −5 |
| 16789 | 100000110010101 | 3 | 9 | −3 |
| 16965 | 100001001000101 | 3 | 11 | −5 |
| 17220 | 10001101000100 | 3 | 11 | −5 |
| 17373 | 100001111011101 | 3 | 11 | 3 |
| 17430 | 100010000010110 | 3 | 11 | −5 |
| 17460 | 100010000110100 | 3 | 11 | −5 |
| 17673 | 100010100001001 | 3 | 11 | −5 |
| 17796 | 100010110001010 | 3 | 11 | −5 |
| 17925 | 100011000000101 | 3 | 11 | −5 |
| 18015 | 100011001011111 | 3 | 7 | 3 |
| 18050 | 100011010000010 | 3 | 11 | −5 |
| 18413 | 100011111101101 | 3 | 9 | 5 |
| 18513 | 100100001010001 | 3 | 11 | −5 |
| 19040 | 100101001100000 | 3 | 11 | −5 |
| 19336 | 100101110001000 | 3 | 11 | −3 |
| 19438 | 100101111101110 | 3 | 11 | 5 |
| 19461 | 100110000000101 | 3 | 11 | −5 |
| 19466 | 100110000001010 | 3 | 7 | −5 |
| 19476 | 100110000010100 | 3 | 11 | −5 |
| 19477 | 100110000010101 | 3 | 7 | −3 |
| 19536 | 100110001010000 | 3 | 11 | −5 |
| 19616 | 100110010100000 | 3 | 11 | −5 |
| 19776 | 100110101000000 | 3 | 7 | −5 |
| 19807 | 100110101011111 | 3 | 7 | 5 |
| 19838 | 100110010111110 | 3 | 11 | 5 |
| 19957 | 100110111110101 | 3 | 11 | 5 |
| 20063 | 100111001011111 | 3 | 11 | 5 |
| 20098 | 100111010000010 | 3 | 11 | −3 |
| 20158 | 100111010111110 | 3 | 11 | 5 |
| 20218 | 100111011111010 | 3 | 11 | 5 |
| 20505 | 10100000000101 | 3 | 11 | −5 |
| 20529 | 101000000101001 | 3 | 11 | −5 |
| 20550 | 101000001000110 | 3 | 11 | −5 |
| 20556 | 101000001001100 | 3 | 11 | −5 |
| 20769 | 101000100100001 | 3 | 11 | −5 |
| 20880 | 101000110010000 | 3 | 11 | −5 |
| 21249 | 101001100000001 | 3 | 11 | −5 |
| 21279 | 101001100011111 | 3 | 11 | 3 |
| 21311 | 101001100111111 | 3 | 11 | 5 |
| 21469 | 101001111011101 | 3 | 11 | 5 |
| 21516 | 101010000000100 | 3 | 7 | −5 |
| 21529 | 101010000011001 | 3 | 7 | −3 |
| 21696 | 101010011000000 | 3 | 7 | −5 |
| 21697 | 101010011000001 | 3 | 9 | −3 |
| 21711 | 101010011011111 | 3 | 11 | 3 |
| 21727 | 101010011011111 | 3 | 7 | 5 |
| 21919 | 101010110011111 | 3 | 7 | 5 |
| 22112 | 101011001100000 | 3 | 7 | −3 |
| 22140 | 101011001101100 | 3 | 11 | 3 |
| 22141 | 101011001111101 | 3 | 11 | 5 |
| 22142 | 101011001111110 | 3 | 9 | 5 |
| 22143 | 101011001111111 | 3 | 7 | 7 |
| 22223 | 101011011001111 | 3 | 11 | 5 |
| 22335 | 101011100111111 | 3 | 7 | 7 |
| 22419 | 101011110010011 | 3 | 11 | 3 |
| 22427 | 101011110011011 | 3 | 7 | 5 |
| 22476 | 101011111001100 | 3 | 11 | 3 |
| 22477 | 101011111001101 | 3 | 11 | 5 |
| 22489 | 101011111011001 | 3 | 11 | 5 |
| 22502 | 10101111110110 | 3 | 7 | 5 |
| 22515 | 101011111110011 | 3 | 7 | 7 |
| 23029 | 100100111101001 | 3 | 11 | 5 |
| 23480 | 101101110111000 | 3 | 9 | 3 |
| 23537 | 101101111110001 | 3 | 9 | 5 |
| 23869 | 101110100111101 | 3 | 11 | 5 |
| 23996 | 101110110111100 | 3 | 11 | 5 |
| 24033 | 101110111100001 | 3 | 11 | 3 |
| 24037 | 101110111100101 | 3 | 11 | 5 |
| 24157 | 101111001011101 | 3 | 11 | 5 |
| 24373 | 101111100110101 | 3 | 11 | 5 |
| 24390 | 101111101000110 | 3 | 11 | 3 |
| 24398 | 101111101001110 | 3 | 11 | 5 |
| 24778 | 110000011001010 | 3 | 11 | −3 |
| 24866 | 110000100100010 | 3 | 11 | −5 |
| 24900 | 110000101000100 | 3 | 11 | −5 |
| 25339 | 110001011111011 | 3 | 11 | 5 |
| 25620 | 110010000010100 | 3 | 11 | −5 |
| 25640 | 110010000101000 | 3 | 11 | −5 |
| 25680 | 110010001010000 | 3 | 11 | −5 |
| 25845 | 110010011110101 | 3 | 11 | 3 |
| 26122 | 110011000001010 | 3 | 11 | −3 |
| 26272 | 110011010100000 | 3 | 7 | −3 |
| 26287 | 110011010101111 | 3 | 11 | 5 |
| 26302 | 110011010111110 | 3 | 11 | 5 |
| 26303 | 110011010111111 | 3 | 7 | 7 |
| 26362 | 110011011111010 | 3 | 11 | 5 |
| 26463 | 110011101011111 | 3 | 11 | 7 |

TABLE 2-continued (n = 15)

| number | bj | max. corr. (forward) | max. corr. (back) | dc level |
|---|---|---|---|---|
| 26580 | 110011111010100 | 3 | 11 | 3 |
| 26602 | 110011111101010 | 3 | 7 | 5 |
| 26613 | 110011111110101 | 3 | 7 | 7 |
| 26863 | 110100011101111 | 3 | 11 | 5 |
| 26999 | 110100101110111 | 3 | 11 | 5 |
| 27118 | 110100111101110 | 3 | 11 | 5 |
| 27148 | 110101000001100 | 3 | 11 | −3 |
| 27232 | 110101001100000 | 3 | 9 | −3 |
| 27343 | 110101011001111 | 3 | 11 | 5 |
| 27454 | 110101100111110 | 3 | 11 | 5 |
| 27455 | 110101100111111 | 3 | 9 | 7 |
| 27622 | 110101111100110 | 3 | 11 | 5 |
| 27628 | 110101111101100 | 3 | 11 | 5 |
| 27688 | 110110000101000 | 3 | 11 | −3 |
| 27823 | 110110010101111 | 3 | 11 | 5 |
| 27893 | 110110011110101 | 3 | 7 | 5 |
| 27975 | 110110101000111 | 3 | 9 | 3 |
| 28318 | 110111010011110 | 3 | 11 | 5 |
| 28348 | 110111010111100 | 3 | 11 | 5 |
| 28462 | 110111100101110 | 3 | 11 | 5 |
| 28579 | 110111110100011 | 3 | 11 | 5 |
| 28946 | 111000100010010 | 3 | 9 | −3 |
| 29019 | 111000101011011 | 3 | 9 | 3 |
| 29535 | 111001101011111 | 3 | 11 | 7 |
| 29943 | 111010011110111 | 3 | 11 | 7 |
| 30111 | 111010110011111 | 3 | 11 | 7 |
| 30180 | 111010111100100 | 3 | 11 | 3 |
| 30188 | 111010111101100 | 3 | 11 | 5 |
| 30486 | 111011100010110 | 3 | 11 | 3 |
| 30539 | 111011101001011 | 3 | 11 | 5 |
| 30543 | 111011101001111 | 3 | 11 | 7 |
| 30615 | 111011110010111 | 3 | 11 | 7 |
| 31095 | 111100101110111 | 3 | 11 | 7 |
| 31125 | 111100110010101 | 3 | 11 | 3 |
| 31147 | 111100110101011 | 3 | 11 | 5 |
| 31157 | 111100110110101 | 3 | 11 | 5 |
| 31387 | 111101010011011 | 3 | 11 | 5 |
| 31411 | 111101010110011 | 3 | 11 | 5 |
| 31462 | 111101011100110 | 3 | 11 | 5 |
| 31468 | 111101011101100 | 3 | 11 | 5 |
| 31546 | 111101100111010 | 3 | 11 | 5 |
| 31627 | 111101110001011 | 3 | 11 | 5 |
| 31845 | 111110001100101 | 3 | 11 | 3 |
| 31946 | 111110011001010 | 3 | 7 | 3 |
| 31956 | 111110011010100 | 3 | 9 | 3 |
| 31957 | 111110011010101 | 3 | 7 | 5 |
| 31958 | 111110011010110 | 3 | 11 | 5 |
| 31959 | 111110011010111 | 3 | 11 | 7 |
| 32049 | 111110100110001 | 3 | 7 | 3 |
| 32057 | 111110100111001 | 3 | 11 | 5 |
| 32076 | 111110101001100 | 3 | 7 | 3 |
| 32089 | 111110101011001 | 3 | 7 | 5 |
| 32102 | 111110101100110 | 3 | 11 | 5 |
| 32103 | 111110101100111 | 3 | 11 | 7 |
| 32115 | 111110101110011 | 3 | 11 | 7 |
| 32149 | 111110110010101 | 3 | 7 | 5 |
| 32357 | 111111001100101 | 3 | 11 | 5 |
| 32362 | 111111001101010 | 3 | 7 | 5 |
| 32363 | 111111001101011 | 3 | 9 | 7 |
| 32373 | 111111001110101 | 3 | 7 | 7 |
| 32422 | 111111010100110 | 3 | 7 | 5 |
| 32435 | 111111010110011 | 3 | 7 | 7 |
| 32565 | 111111100110101 | 3 | 7 | 7 |

TABLE 3

(n = 17)

| number | bj | max. corr. (forward) | max. corr. (back) | dc level |
|---|---|---|---|---|
| 2931 | 00000101101110011 | 3 | 9 | −1 |
| 3253 | 00000110010110101 | 3 | 9 | −3 |
| 3286 | 00000110011010110 | 3 | 9 | −3 |
| 3685 | 00000111001100101 | 3 | 13 | −3 |
| 3693 | 00000111001101101 | 3 | 11 | −1 |
| 3893 | 00000111100110101 | 3 | 9 | −1 |
| 3929 | 00000111101011001 | 3 | 11 | −1 |
| 5555 | 00001010110110011 | 3 | 9 | −1 |
| 5838 | 00001011011001110 | 3 | 11 | −1 |
| 6443 | 00001100100101011 | 3 | 9 | −3 |
| 6581 | 00001100110110101 | 3 | 13 | −1 |
| 6775 | 00001101001110111 | 3 | 13 | 1 |
| 6877 | 00001101011011101 | 3 | 9 | 1 |
| 7386 | 00001110011011010 | 3 | 11 | −1 |
| 7642 | 00001110111011010 | 3 | 9 | 1 |
| 7859 | 00001111010110011 | 3 | 9 | 1 |
| 7901 | 00001111011011101 | 3 | 11 | 3 |
| 7917 | 00001111011101101 | 3 | 13 | 3 |
| 9039 | 00010001101001111 | 3 | 13 | −1 |
| 9125 | 00010001110100101 | 3 | 11 | −3 |
| 9171 | 00010001111010011 | 3 | 9 | −1 |
| 9189 | 00010001111100101 | 3 | 9 | −1 |
| 11111 | 00010101101100111 | 3 | 9 | 1 |
| 12121 | 00010111101011001 | 3 | 9 | 1 |
| 12887 | 00011001001010111 | 3 | 9 | −1 |
| 14773 | 00011100110110101 | 3 | 11 | 1 |
| 15269 | 00011101110100101 | 3 | 13 | 1 |
| 15284 | 00011101110110100 | 3 | 9 | 1 |
| 15716 | 00011110101100100 | 3 | 11 | −1 |
| 15718 | 00011110101100110 | 3 | 9 | 1 |
| 16217 | 00011111101011001 | 3 | 9 | 3 |
| 17596 | 00100010010111100 | 3 | 13 | −3 |
| 18110 | 00100011010111110 | 3 | 9 | 1 |
| 19499 | 00100110000101011 | 3 | 13 | −3 |
| 19578 | 00100110001111010 | 3 | 11 | −1 |
| 19832 | 00100110101111000 | 3 | 11 | −1 |
| 20590 | 00101000001101110 | 3 | 9 | −3 |
| 20716 | 00101000011101100 | 3 | 13 | −3 |
| 21054 | 00101001000111110 | 3 | 13 | −1 |
| 21310 | 00101001100111110 | 3 | 9 | 1 |
| 22223 | 00101011011001111 | 3 | 9 | 3 |
| 22427 | 00101011110011011 | 3 | 13 | 3 |
| 23075 | 00101101000100011 | 3 | 13 | −3 |
| 23480 | 00101101110111000 | 3 | 9 | 1 |
| 24749 | 00110000010101101 | 3 | 9 | −3 |
| 24757 | 00110000010110101 | 3 | 11 | −3 |
| 24765 | 00110000010111101 | 3 | 9 | −1 |
| 25183 | 00110001001011111 | 3 | 9 | 1 |
| 25775 | 00110010010101111 | 3 | 9 | 1 |
| 25871 | 00110010100001111 | 3 | 9 | −1 |
| 26578 | 00110011111010010 | 3 | 9 | 1 |
| 26743 | 00110100001110111 | 3 | 9 | 1 |
| 28180 | 00110111000010100 | 3 | 13 | −3 |
| 30539 | 00111011101001011 | 3 | 13 | 3 |
| 31300 | 00111101001000100 | 3 | 13 | −3 |
| 31946 | 00111110011001010 | 3 | 9 | 1 |
| 31958 | 00111110011010110 | 3 | 13 | 3 |
| 33229 | 01000000111001101 | 3 | 9 | −3 |
| 34291 | 01000010111110011 | 3 | 9 | 1 |
| 35087 | 01000100100001111 | 3 | 11 | −3 |
| 35151 | 01000100101001111 | 3 | 9 | −1 |
| 35193 | 01000100101111001 | 3 | 9 | −1 |
| 35301 | 01000100111100101 | 3 | 13 | −1 |
| 37135 | 01001000100001111 | 3 | 13 | −3 |
| 37150 | 01001000100110110 | 3 | 9 | −3 |
| 37663 | 01001001100011111 | 3 | 11 | 1 |
| 38387 | 01001010111110011 | 3 | 9 | 3 |
| 38860 | 01001011111001100 | 3 | 9 | 1 |
| 38862 | 01001011111001110 | 3 | 11 | 3 |
| 39165 | 01001100011111101 | 3 | 9 | 3 |
| 41433 | 01010000111011001 | 3 | 9 | −1 |
| 42183 | 01010010011000111 | 3 | 11 | −1 |
| 42191 | 01010010011001111 | 3 | 13 | 1 |
| 42399 | 01010010110011111 | 3 | 9 | 3 |

TABLE 3-continued (n = 17)

| number | bj | max. corr. (forward) | max. corr. (back) | dc level |
|---|---|---|---|---|
| 42483 | 01010010111110011 | 3 | 11 | 3 |
| 42527 | 01010011000011111 | 3 | 9 | 1 |
| 42620 | 01010011001111100 | 3 | 9 | 1 |
| 45175 | 01011000001110111 | 3 | 9 | 1 |
| 45277 | 01011000011011101 | 3 | 13 | 1 |
| 45855 | 01011001100011111 | 3 | 13 | 3 |
| 45953 | 01011001110000001 | 3 | 9 | −3 |
| 46105 | 01011010000011001 | 3 | 9 | −3 |
| 46151 | 01011010001000111 | 3 | 13 | −1 |
| 46199 | 01011010001110111 | 3 | 11 | 3 |
| 46704 | 01011011001110000 | 3 | 11 | −1 |
| 46960 | 01011011101110000 | 3 | 9 | 1 |
| 48228 | 01011110001100100 | 3 | 11 | −1 |
| 48921 | 01011111100011001 | 3 | 9 | 3 |
| 49885 | 01100001011011101 | 3 | 9 | 1 |
| 50366 | 01100010010111110 | 3 | 13 | 1 |
| 51445 | 01100100011110101 | 3 | 9 | 1 |
| 51719 | 01100101000000111 | 3 | 9 | −3 |
| 51735 | 01100101000010111 | 3 | 9 | −1 |
| 51743 | 01100101000011111 | 3 | 11 | 1 |
| 52600 | 01100110101111000 | 3 | 9 | 1 |
| 52741 | 01100111000000101 | 3 | 9 | −3 |
| 53157 | 01100111110100101 | 3 | 9 | 3 |
| 53486 | 01101000011101110 | 3 | 13 | 1 |
| 54880 | 01101011001100000 | 3 | 9 | −3 |
| 54908 | 01101011001111100 | 3 | 13 | 3 |
| 56801 | 01101110111100001 | 3 | 13 | 3 |
| 59009 | 01110010100000001 | 3 | 13 | −3 |
| 59088 | 01110011011010000 | 3 | 11 | −1 |
| 59346 | 01110011111010010 | 3 | 11 | 3 |
| 60436 | 01110110000010100 | 3 | 9 | −3 |
| 60950 | 01110111000010101 | 3 | 13 | 1 |
| 61577 | 01111000010001001 | 3 | 13 | −3 |
| 61714 | 01111001000010010 | 3 | 9 | −3 |
| 63636 | 01111100010010100 | 3 | 13 | −1 |
| 63892 | 01111100110010100 | 3 | 9 | 1 |
| 64070 | 01111101001000110 | 3 | 13 | 1 |
| 64196 | 01111110001100101 | 3 | 9 | 1 |
| 64613 | 01111110001100101 | 3 | 9 | 3 |
| 64817 | 01111110100110001 | 3 | 13 | 3 |
| 66254 | 10000001011001110 | 3 | 13 | −3 |
| 66458 | 10000001110011010 | 3 | 9 | −3 |
| 66875 | 10000010100111011 | 3 | 9 | −1 |
| 67001 | 10000010110111011 | 3 | 13 | −1 |
| 67179 | 10000011001101011 | 3 | 9 | −1 |
| 67435 | 10000011101101011 | 3 | 13 | 1 |
| 69357 | 10000111011101101 | 3 | 9 | 3 |
| 69494 | 10000111101110110 | 3 | 13 | 3 |
| 70121 | 10001000111101001 | 3 | 13 | −1 |
| 70635 | 10001001111101011 | 3 | 9 | 3 |
| 71725 | 10001100000101101 | 3 | 11 | −3 |
| 71983 | 10001100100101111 | 3 | 11 | 1 |
| 72062 | 10001100101111110 | 3 | 13 | 3 |
| 74270 | 10010001000011110 | 3 | 13 | −3 |
| 76163 | 10010100110000011 | 3 | 13 | −3 |
| 76191 | 10010100110011111 | 3 | 9 | 3 |
| 77585 | 10010111100010001 | 3 | 13 | −1 |
| 77914 | 10011000001011010 | 3 | 9 | −3 |
| 78330 | 10011000111111010 | 3 | 9 | 3 |
| 78471 | 10011001010000111 | 3 | 9 | −1 |
| 79328 | 10011010111100000 | 3 | 11 | −1 |
| 79336 | 10011010111101000 | 3 | 9 | 1 |
| 79352 | 10011010111111000 | 3 | 9 | 3 |
| 79626 | 10011011100001010 | 3 | 9 | −1 |
| 80705 | 10011101101000001 | 3 | 13 | −1 |
| 81186 | 10011110100100010 | 3 | 9 | −1 |
| 82150 | 10100000011100110 | 3 | 9 | −3 |
| 82843 | 10100001110011011 | 3 | 11 | 1 |
| 84111 | 10100100100011111 | 3 | 9 | −1 |
| 84367 | 10100100110001111 | 3 | 11 | 1 |
| 84872 | 10100101110001000 | 3 | 11 | −3 |
| 84920 | 10100101110111000 | 3 | 13 | 1 |
| 84966 | 10100101111100110 | 3 | 9 | 3 |
| 85118 | 10100110001111110 | 3 | 9 | 3 |
| 85216 | 10100110011100000 | 3 | 13 | −3 |
| 85794 | 10100111100100010 | 3 | 13 | −1 |
| 85896 | 10100111110001000 | 3 | 9 | −1 |
| 88451 | 10101100100000011 | 3 | 9 | −1 |
| 88544 | 10101100111100000 | 3 | 9 | −1 |
| 88588 | 10101101000001100 | 3 | 11 | −3 |
| 88672 | 10101101001100000 | 3 | 9 | −3 |
| 88880 | 10101101100110000 | 3 | 13 | −1 |
| 88888 | 10101101100111000 | 3 | 11 | 1 |
| 89638 | 10101111000100110 | 3 | 9 | 1 |
| 91906 | 10110011100000010 | 3 | 9 | −3 |
| 92209 | 10110100000110001 | 3 | 11 | −3 |
| 92211 | 10110100000110011 | 3 | 9 | −1 |
| 92684 | 10110101000001100 | 3 | 9 | −3 |
| 93408 | 10110110011100000 | 3 | 11 | −1 |
| 93921 | 10110111011100001 | 3 | 9 | 3 |
| 93936 | 10110111011110000 | 3 | 13 | 3 |
| 95770 | 10111011000011010 | 3 | 13 | 1 |
| 95878 | 10111011000100110 | 3 | 9 | 1 |
| 95920 | 10111011010110000 | 3 | 9 | 1 |
| 95984 | 10111011011110000 | 3 | 11 | 3 |
| 96780 | 10111101000001100 | 3 | 9 | −1 |
| 97842 | 10111111000110010 | 3 | 9 | 3 |
| 99113 | 11000001100101001 | 3 | 13 | −3 |
| 99125 | 11000001100110101 | 3 | 9 | −1 |
| 99771 | 11000010110111011 | 3 | 13 | 3 |
| 100532 | 11000100010110100 | 3 | 13 | −3 |
| 102891 | 11001000111110011 | 3 | 13 | 3 |
| 104328 | 11001011110001000 | 3 | 9 | −1 |
| 104493 | 11001100000101101 | 3 | 9 | −1 |
| 105200 | 11001101011110000 | 3 | 9 | 1 |
| 105296 | 11001101101010000 | 3 | 9 | −1 |
| 105888 | 11001110110100000 | 3 | 9 | −1 |
| 106306 | 11001111101000010 | 3 | 9 | 1 |
| 106314 | 11001111101001010 | 3 | 11 | 3 |
| 106322 | 11001111101010010 | 3 | 9 | 3 |
| 107591 | 11010010001000111 | 3 | 9 | −1 |
| 107996 | 11010010111011100 | 3 | 13 | 3 |
| 108644 | 11010100001100100 | 3 | 13 | −3 |
| 108848 | 11010100100110000 | 3 | 9 | −3 |
| 109761 | 11010110011000001 | 3 | 9 | −1 |
| 110017 | 11010110111000001 | 3 | 13 | 1 |
| 110355 | 11010111100010011 | 3 | 13 | 3 |
| 110481 | 11010111110010001 | 3 | 9 | 3 |
| 111239 | 11011001010000111 | 3 | 11 | 1 |
| 111493 | 11011001110000101 | 3 | 11 | 1 |
| 111572 | 11011001111010100 | 3 | 13 | 3 |
| 112961 | 11011100101000001 | 3 | 9 | −1 |
| 113475 | 11011101101000011 | 3 | 13 | 3 |
| 114854 | 11100000010100110 | 3 | 9 | −3 |
| 115353 | 11100001010011001 | 3 | 9 | −1 |
| 115355 | 11100001010011011 | 3 | 11 | 1 |
| 115787 | 11100010001001011 | 3 | 9 | −1 |
| 115802 | 11100010001011010 | 3 | 13 | −1 |
| 116298 | 11100011001001010 | 3 | 11 | −1 |
| 118184 | 11100110110101000 | 3 | 9 | 1 |
| 118950 | 11101000010100110 | 3 | 9 | −1 |
| 119960 | 11101010010011000 | 3 | 9 | −1 |
| 121882 | 11101110000011010 | 3 | 9 | 1 |
| 121900 | 11101110000101100 | 3 | 9 | 1 |
| 121946 | 11101110001011010 | 3 | 11 | 3 |
| 122032 | 11101110010110000 | 3 | 13 | 1 |
| 123154 | 11110000100010010 | 3 | 13 | −3 |
| 123170 | 11110000100100010 | 3 | 11 | −3 |
| 123212 | 11110000101001100 | 3 | 9 | −1 |
| 123429 | 11110001000100101 | 3 | 9 | −1 |
| 123685 | 11110001100100101 | 3 | 11 | 1 |
| 124194 | 11110010100100010 | 3 | 9 | −1 |
| 124296 | 11110010110001000 | 3 | 13 | −1 |
| 124490 | 11110011001001010 | 3 | 13 | 1 |
| 124628 | 11110011011010100 | 3 | 9 | 3 |
| 125233 | 11110100100110001 | 3 | 11 | 1 |
| 125516 | 11110101001001100 | 3 | 9 | 1 |
| 127142 | 11111000010100110 | 3 | 11 | 1 |

TABLE 3-continued (n = 17)

| number | bj | max. corr. (forward) | max. corr. (back) | dc level |
|---|---|---|---|---|
| 127178 | 11111000011001010 | 3 | 9 | 1 |
| 127378 | 11111000110010010 | 3 | 11 | 1 |
| 127386 | 11111000110011010 | 3 | 13 | 3 |
| 127785 | 11111001100101001 | 3 | 9 | 3 |
| 127818 | 11111001101001010 | 3 | 9 | 3 |
| 128140 | 11111010010001100 | 3 | 9 | 1 |

TABLE 4

(n = 19)

| number | bj | max. corr. (forward) | max. corr. (back) | dc level |
|---|---|---|---|---|
| 3241 | 0000000110010101001 | 3 | 15 | −7 |
| 10342 | 0000010100001100110 | 3 | 15 | −7 |
| 26897 | 0000110100100010001 | 3 | 15 | −7 |
| 28946 | 0000111000100010010 | 3 | 7 | −7 |
| 33705 | 0001000011101010010 | 3 | 11 | −5 |
| 34996 | 0001000100010110100 | 3 | 11 | −7 |
| 37560 | 0001001001010111000 | 3 | 15 | −5 |
| 59976 | 0001110101001001000 | 3 | 15 | −5 |
| 61146 | 0001110111011011010 | 3 | 7 | 3 |
| 64429 | 0001111101110101101 | 3 | 9 | 5 |
| 66385 | 0010000001101010001 | 3 | 11 | −7 |
| 70117 | 0010001000111100101 | 3 | 15 | −3 |
| 74076 | 0010010000101011100 | 3 | 15 | −5 |
| 86785 | 0010101001100000001 | 3 | 15 | −7 |
| 92296 | 0010110100010001000 | 3 | 11 | −7 |
| 95265 | 0010111010000100001 | 3 | 11 | −5 |
| 97651 | 0010111110101110011 | 3 | 15 | 5 |
| 100875 | 0011000101000001011 | 3 | 15 | −5 |
| 104970 | 0011001101000001010 | 3 | 15 | −5 |
| 119844 | 0011101010000100100 | 3 | 15 | −5 |
| 129885 | 0011111101101011101 | 3 | 11 | 7 |
| 130261 | 0011111110011010101 | 3 | 15 | 5 |
| 139806 | 0100010001000011110 | 3 | 11 | −5 |
| 141571 | 0100010100100000011 | 3 | 11 | −7 |
| 145426 | 0100011100000010010 | 3 | 15 | −7 |
| 147682 | 0100100000111100010 | 3 | 15 | −7 |
| 148592 | 0100100010001110000 | 3 | 7 | −7 |
| 151815 | 0100101000100000111 | 3 | 9 | −5 |
| 164556 | 0101000001011001100 | 3 | 15 | −5 |
| 173571 | 0101010011000000011 | 3 | 15 | −5 |
| 181179 | 0101100001110111011 | 3 | 15 | 3 |
| 187320 | 0101101101110111000 | 3 | 7 | 3 |
| 204961 | 0110010000010100001 | 3 | 15 | −7 |
| 209056 | 0110011000010100000 | 3 | 15 | −7 |
| 217591 | 0110101000111110111 | 3 | 11 | 5 |
| 218751 | 0110101011001111111 | 3 | 15 | 7 |
| 229006 | 0110111110100001110 | 3 | 15 | 5 |
| 232438 | 0111000101111110110 | 3 | 15 | 5 |
| 240123 | 0111010100111111011 | 3 | 11 | 7 |
| 244559 | 0111011101101001111 | 3 | 15 | 7 |
| 246306 | 0111100001000100010 | 3 | 11 | −5 |
| 251865 | 0111101011111011001 | 3 | 15 | 7 |
| 253579 | 0111110110100001011 | 3 | 11 | 5 |
| 260523 | 0111111100110101011 | 3 | 15 | 7 |
| 263764 | 1000000110010100100 | 3 | 15 | −7 |
| 270708 | 1000010000101110100 | 3 | 11 | −5 |
| 272422 | 1000010100000100110 | 3 | 15 | −7 |
| 277981 | 1000011110111011101 | 3 | 11 | 5 |
| 279728 | 1000100100101110000 | 3 | 15 | −7 |
| 284164 | 1000101011000000100 | 3 | 11 | −7 |
| 291849 | 1000111010000001001 | 3 | 15 | −5 |
| 295281 | 1001000000101110001 | 3 | 15 | −5 |
| 305536 | 1001010100110000000 | 3 | 15 | −7 |
| 306696 | 1001010111000001000 | 3 | 11 | −5 |
| 315231 | 1001100111101011111 | 3 | 15 | 7 |
| 319326 | 1001101111101011110 | 3 | 15 | 7 |
| 336967 | 1010010010001000111 | 3 | 7 | −3 |

TABLE 4-continued (n = 19)

| number | bj | max. corr. (forward) | max. corr. (back) | dc level |
|---|---|---|---|---|
| 343108 | 1010011110001000100 | 3 | 15 | −3 |
| 350716 | 1010101100111111100 | 3 | 15 | 5 |
| 359731 | 1010111110100110011 | 3 | 15 | 5 |
| 372472 | 1011010111011111000 | 3 | 9 | 5 |
| 375695 | 1011011101110001111 | 3 | 7 | 7 |
| 376605 | 1011011111100011101 | 3 | 15 | 7 |
| 378861 | 1011100011111101101 | 3 | 15 | 7 |
| 382716 | 1011101011011111100 | 3 | 11 | 7 |
| 384481 | 1011101110111100001 | 3 | 11 | 5 |
| 394026 | 1100000001100101010 | 3 | 15 | −5 |
| 394402 | 1100000010010100010 | 3 | 11 | −7 |
| 404443 | 1100010101111011011 | 3 | 15 | 5 |
| 419317 | 1100110010111110101 | 3 | 15 | 5 |
| 423412 | 1100111010111110100 | 3 | 15 | 5 |
| 426636 | 1101010000101000100 | 3 | 15 | −5 |
| 429022 | 1101010101111011110 | 3 | 11 | 5 |
| 431991 | 1101011011101110111 | 3 | 11 | 7 |
| 437502 | 1101010110011111110 | 3 | 15 | 7 |
| 450211 | 1101101111010100011 | 3 | 15 | 5 |
| 454170 | 1101110111000011010 | 3 | 15 | 3 |
| 457902 | 1101111110010101110 | 3 | 11 | 7 |
| 459858 | 1110000010001010010 | 3 | 9 | −5 |
| 463141 | 1110001000100100101 | 3 | 7 | −3 |
| 464311 | 1110001010101110111 | 3 | 15 | 5 |
| 486727 | 1110110110101000111 | 3 | 15 | 5 |
| 489291 | 1110111011101001011 | 3 | 11 | 7 |
| 490582 | 1110111110001010110 | 3 | 11 | 5 |
| 495341 | 1111000111011101101 | 3 | 7 | 7 |
| 497390 | 1111001011011101110 | 3 | 15 | 7 |
| 513945 | 1111101011110011001 | 3 | 15 | 7 |
| 521046 | 1111111001101010110 | 3 | 15 | 7 |

TABLE 5

(n = 21)

| number | bj | max. corr. (forward) | max. corr. (backward) | dc level |
|---|---|---|---|---|
| 14773 | 000000011100110110101 | 3 | 15 | −3 |
| 23865 | 000000101110100111001 | 3 | 13 | −3 |
| 29546 | 000000111001101101010 | 3 | 11 | −3 |
| 31157 | 000000111100110110101 | 3 | 11 | −1 |
| 47731 | 000001011101001110011 | 3 | 15 | −1 |
| 55754 | 000001101100111001010 | 3 | 11 | −3 |
| 59029 | 000001110011010010101 | 3 | 11 | −3 |
| 59093 | 000001110011011010101 | 3 | 15 | −1 |
| 59245 | 000001110011101101101 | 3 | 15 | 1 |
| 60249 | 000001110101101011001 | 3 | 15 | −1 |
| 62294 | 000001111001101110110 | 3 | 17 | −1 |
| 81210 | 000010011110100111010 | 3 | 15 | −1 |
| 89708 | 000010101110011001100 | 3 | 21 | −1 |
| 183260 | 000101100101110011100 | 3 | 17 | 1 |
| 231861 | 000111000100110110101 | 3 | 15 | −1 |
| 248388 | 000111100101001000100 | 3 | 13 | −5 |
| 255570 | 000111110011001010010 | 3 | 13 | −1 |
| 257750 | 000111111011011010110 | 3 | 13 | 5 |
| 276270 | 001000011011101101110 | 3 | 11 | −1 |
| 281208 | 001000100101001111000 | 3 | 13 | −5 |
| 281571 | 001000100101111100011 | 3 | 13 | −1 |
| 331699 | 001010001111101100110 | 3 | 15 | 1 |
| 336446 | 001010010010001011110 | 3 | 13 | −3 |
| 397237 | 001100000111101101101 | 3 | 15 | 1 |
| 406623 | 001100010100010111111 | 3 | 15 | 1 |
| 410091 | 001100100001111010011 | 3 | 15 | −1 |
| 442901 | 001101011001011010101 | 3 | 13 | −5 |
| 446288 | 001101100111101010000 | 3 | 21 | −1 |
| 459446 | 001110000010101101010 | 3 | 11 | −3 |
| 460219 | 001110000010101111011 | 3 | 13 | 1 |
| 490088 | 001110111010011101000 | 3 | 17 | 1 |
| 509010 | 001111100010001010010 | 3 | 13 | −3 |

TABLE 5-continued (n = 21)

| number | bj | max. corr. (forward) | max. corr. (backward) | dc level |
|---|---|---|---|---|
| 521034 | 001111111001101001010 | 3 | 17 | 3 |
| 521046 | 001111111001101010110 | 3 | 17 | 5 |
| 549238 | 010000110000101110110 | 3 | 17 | −3 |
| 598815 | 010010010001100011111 | 3 | 15 | −1 |
| 607356 | 010010100010001111100 | 3 | 13 | −3 |
| 609528 | 010010100110011111000 | 3 | 13 | −1 |
| 614638 | 010010110000011101110 | 3 | 13 | −1 |
| 659673 | 010100001000011011001 | 3 | 15 | −5 |
| 672243 | 010100100000111110011 | 3 | 15 | −1 |
| 674879 | 010100100110000111111 | 3 | 11 | 1 |
| 674943 | 010100100110001111111 | 3 | 15 | 3 |
| 675271 | 010100100110111000111 | 3 | 15 | 1 |
| 678396 | 010100101100111111100 | 3 | 17 | 3 |
| 684896 | 010100111001101100000 | 3 | 11 | −3 |
| 693023 | 010101001001100011111 | 3 | 15 | 1 |
| 709407 | 010101101001100011111 | 3 | 11 | 3 |
| 711104 | 010101101100110000000 | 3 | 11 | −3 |
| 718739 | 010101111011110010011 | 3 | 13 | 5 |
| 759696 | 010111001011110010000 | 3 | 15 | −1 |
| 783558 | 010111111010011000110 | 3 | 21 | 3 |
| 812538 | 011000110010111111010 | 3 | 21 | 3 |
| 813247 | 011000110100010111111 | 3 | 13 | 3 |
| 827125 | 011001001111011110101 | 3 | 15 | 5 |
| 828703 | 011001010010100011111 | 3 | 15 | 1 |
| 846657 | 011001110101101000001 | 3 | 15 | −1 |
| 874976 | 011010101100111000000 | 3 | 17 | −1 |
| 875004 | 011010101100111111100 | 3 | 17 | 5 |
| 880376 | 011010110111011111000 | 3 | 13 | 5 |
| 895004 | 011011010100000011100 | 3 | 11 | −3 |
| 896785 | 011011010111100010001 | 3 | 13 | 1 |
| 905410 | 011011101000011000010 | 3 | 17 | −3 |
| 957828 | 011101001110110000100 | 3 | 11 | −1 |
| 975058 | 011101110000011010010 | 3 | 13 | −1 |
| 975177 | 011101110000101001001 | 3 | 13 | −1 |
| 1018004 | 011111000100010010100 | 3 | 13 | −3 |
| 1025305 | 011111010010100011001 | 3 | 15 | 1 |
| 1071846 | 100000101101011100110 | 3 | 15 | −1 |
| 1079147 | 100000111011101101011 | 3 | 13 | 3 |
| 1121974 | 100010001111010110110 | 3 | 13 | 1 |
| 1122093 | 100010001111100101101 | 3 | 13 | 1 |
| 1139323 | 100010110001001111011 | 3 | 11 | 1 |
| 1191741 | 100100010111100111101 | 3 | 17 | 3 |
| 1200366 | 100100101000011101110 | 3 | 13 | −1 |
| 1202147 | 100100101011111100011 | 3 | 11 | 3 |
| 1216775 | 100101001000100000111 | 3 | 13 | −5 |
| 1222147 | 100101010011000000011 | 3 | 17 | −5 |
| 1222175 | 100101010011000011111 | 3 | 17 | 1 |
| 1250494 | 100110001010010111110 | 3 | 15 | 1 |
| 1268448 | 100110101101011100000 | 3 | 15 | −1 |
| 1270026 | 100110110000100001010 | 3 | 15 | −5 |
| 1283904 | 100111001011101000000 | 3 | 13 | −3 |
| 1284613 | 100111001101000000101 | 3 | 21 | −3 |
| 1313593 | 101000000101100111001 | 3 | 21 | −3 |
| 1337455 | 101000110100001101111 | 3 | 15 | 1 |
| 1378412 | 101010000100011101100 | 3 | 13 | −5 |
| 1386047 | 101010010011000111111 | 3 | 11 | 3 |
| 1387744 | 101010010111001100000 | 3 | 11 | −3 |
| 1404128 | 101010110110011100000 | 3 | 15 | −1 |
| 1412255 | 101011000110010011111 | 3 | 11 | 3 |
| 1418755 | 101011010011000000011 | 3 | 17 | −3 |
| 1421880 | 101011011100100011000 | 3 | 15 | −1 |
| 1422208 | 101011011001110000000 | 3 | 15 | −3 |
| 1422272 | 101011011001111000000 | 3 | 11 | −1 |
| 1424908 | 101011011111000001100 | 3 | 15 | 1 |
| 1437478 | 101011110111100100110 | 3 | 15 | 5 |
| 1482513 | 101101001111100010001 | 3 | 13 | 1 |
| 1487623 | 101101011001100000111 | 3 | 13 | 1 |
| 1489795 | 101101011101110000011 | 3 | 13 | 3 |
| 1498336 | 101101101111001100000 | 3 | 15 | 1 |
| 1547913 | 101111001111000001001 | 3 | 17 | 3 |
| 1576105 | 110000000110010101001 | 3 | 17 | −5 |
| 1576117 | 110000000110010110101 | 3 | 17 | 3 |
| 1588141 | 110000011101110101101 | 3 | 13 | 3 |
| 1607063 | 110001000010110010111 | 3 | 17 | −1 |
| 1636932 | 110001111101001000100 | 3 | 13 | −1 |
| 1637705 | 110001111110101001001 | 3 | 11 | 3 |
| 1650863 | 110010011000010101111 | 3 | 21 | 1 |
| 1654250 | 110010011110111101010 | 3 | 13 | 5 |
| 1687060 | 110011011110000010100 | 3 | 15 | 1 |
| 1690528 | 110011100101110100000 | 3 | 15 | −1 |
| 1699914 | 110011111000001001010 | 3 | 15 | −1 |
| 1760705 | 110101101110111000001 | 3 | 13 | 3 |
| 1765452 | 110101111000001001100 | 3 | 15 | −1 |
| 1815580 | 110111011010000011100 | 3 | 13 | 1 |
| 1815943 | 110111011010101000011 | 3 | 13 | 5 |
| 1820881 | 110111100100011010001 | 3 | 11 | 1 |
| 1839401 | 111000001000100101001 | 3 | 13 | −5 |
| 1841581 | 111000011001101011101 | 3 | 13 | 1 |
| 1848763 | 111000101010110111011 | 3 | 13 | 5 |
| 1865290 | 111001101011001001010 | 3 | 15 | 1 |
| 1913891 | 111010011010000100011 | 3 | 17 | −1 |
| 2007443 | 111101010001100010011 | 3 | 21 | 1 |
| 2015941 | 111101110000101100101 | 3 | 11 | 1 |
| 2034857 | 111110000110010101001 | 3 | 17 | 1 |
| 2036902 | 111110001010010100110 | 3 | 15 | 1 |
| 2037906 | 111110001100010010010 | 3 | 15 | −1 |
| 2038058 | 111110001100100101010 | 3 | 15 | 1 |
| 2038122 | 111110001100101101010 | 3 | 11 | 3 |
| 2041397 | 111110010011000110101 | 3 | 11 | 3 |
| 2049420 | 111110100010110001100 | 3 | 15 | 1 |
| 2065994 | 111111000011001001010 | 3 | 11 | 1 |
| 2067605 | 111111000110010010101 | 3 | 11 | 3 |
| 2073286 | 111111010001011000110 | 3 | 13 | 3 |
| 2082378 | 111111100011001001010 | 3 | 15 | 3 |

TABLE 6

(n = 23)

| number | bj | max. corr. (forward) | max. corr. (backward) | dc level |
|---|---|---|---|---|
| 29362 | 00000000111001010110010 | 3 | 15 | −7 |
| 75541 | 00000010010011100010101 | 3 | 11 | −7 |
| 86422 | 00000010101000110010110 | 3 | 15 | −7 |
| 115861 | 00000011100010010010101 | 3 | 11 | −7 |
| 271825 | 00001000010010111010001 | 3 | 11 | −7 |
| 272197 | 00001000010011101000101 | 3 | 15 | −7 |
| 333508 | 00001010001011011000100 | 3 | 11 | −7 |
| 345892 | 00001010100011100100100 | 3 | 15 | −7 |
| 463141 | 00001110001000100100101 | 3 | 11 | −7 |
| 476197 | 00001110100100010000101 | 3 | 11 | −7 |
| 496708 | 00001111001010001000100 | 3 | 15 | −7 |
| 543651 | 00010000100101110100011 | 3 | 11 | −5 |
| 789930 | 00011000000110110101010 | 3 | 15 | −5 |
| 1031085 | 00011111011101110101101 | 3 | 11 | 7 |
| 1082833 | 00100001000101101010001 | 3 | 11 | −7 |
| 1083205 | 00100001000111101000101 | 3 | 11 | −7 |
| 1116052 | 00100010000111100010100 | 3 | 11 | −7 |
| 1119472 | 00100010001010011110000 | 3 | 15 | −7 |
| 1142932 | 00100010111000100010100 | 3 | 11 | −7 |
| 1160272 | 00100011010100010100000 | 3 | 11 | −7 |
| 1181041 | 00100100000010101110001 | 3 | 15 | −7 |
| 1208656 | 00100100111000101010000 | 3 | 15 | −7 |
| 1345348 | 00101001000001101000100 | 3 | 11 | −7 |
| 1372228 | 00101001111000001000100 | 3 | 11 | −7 |
| 1524769 | 00101110100010000100001 | 3 | 11 | −7 |
| 1906423 | 00111010001011111110111 | 3 | 11 | 5 |
| 1994730 | 00111100110111111101010 | 3 | 15 | 7 |
| 2285833 | 01000101110000100001001 | 3 | 11 | −7 |
| 2429191 | 01001010001000100000111 | 3 | 11 | −7 |
| 2533120 | 01001101010011100000000 | 3 | 15 | −7 |
| 2807832 | 01010101101100000011000 | 3 | 15 | −5 |

TABLE 6-continued (n = 23)

| number | bj | max. corr. (forward) | max. corr. (backward) | dc level |
|---|---|---|---|---|
| 2846271 | 01010110110110001111 | 3 | 11 | 7 |
| 2854335 | 01010111000110110111 | 3 | 11 | 7 |
| 2882364 | 01010111111101100111100 | 3 | 15 | 7 |
| 2965230 | 01011010011111011101110 | 3 | 15 | 7 |
| 2997135 | 01011011011110001111 | 3 | 11 | 7 |
| 3010191 | 01011011110111010001111 | 3 | 11 | 7 |
| 3050991 | 01011101000110111101111 | 3 | 15 | 7 |
| 3051387 | 01011101000111101111011 | 3 | 11 | 7 |
| 3128430 | 01011110111100011011 | 3 | 11 | 7 |
| 3141006 | 01011111101101100011110 | 3 | 15 | 7 |
| 3458368 | 01101001100010101000000 | 3 | 15 | −7 |
| 3652701 | 01101111011110001011101 | 3 | 11 | 7 |
| 3715035 | 01110001010111110011011 | 3 | 15 | 7 |
| 3726330 | 01110001101101111111010 | 3 | 15 | 7 |
| 3812847 | 01110100010110111110111 | 3 | 11 | 7 |
| 3813243 | 01110100010111101111011 | 3 | 11 | 7 |
| 3874554 | 01110110001111011111010 | 3 | 11 | 7 |
| 3910974 | 01110111010110100111110 | 3 | 11 | 7 |
| 3915354 | 01110111011111001011010 | 3 | 15 | 7 |
| 3922494 | 01110111101101000111110 | 3 | 11 | 7 |
| 4058763 | 01111011110111010001011 | 3 | 11 | 7 |
| 4074990 | 01111110001011011110110 | 3 | 11 | 7 |
| 4086510 | 01111110010110101111110 | 3 | 11 | 7 |
| 4302097 | 10000011010010100010001 | 3 | 11 | −7 |
| 4313617 | 10000111010010000010001 | 3 | 11 | −7 |
| 4329844 | 10000100001001011110100 | 3 | 11 | −7 |
| 4466113 | 10001000100010111000001 | 3 | 11 | −7 |
| 4473253 | 10001000100000110100101 | 3 | 15 | −7 |
| 4477633 | 10001000101001011000001 | 3 | 11 | −7 |
| 4514053 | 10001000111000010000101 | 3 | 11 | −7 |
| 4575364 | 10001011101000010000100 | 3 | 11 | −7 |
| 4575760 | 10001011101001000010000 | 3 | 11 | −7 |
| 4662277 | 10001110010010000000101 | 3 | 15 | −7 |
| 4673572 | 10001110101000000100100 | 3 | 15 | −7 |
| 4735906 | 10010000100001110100010 | 3 | 11 | −7 |
| 4930239 | 10010110011101010111111 | 3 | 15 | 7 |
| 5247601 | 10100000001001001110001 | 3 | 15 | −7 |
| 5260177 | 10100000010001110010001 | 3 | 11 | −7 |
| 5337220 | 10100010110001000010100 | 3 | 11 | −7 |
| 5337616 | 10100010111001000010000 | 3 | 15 | −7 |
| 5378416 | 10100100001000101110000 | 3 | 11 | −7 |
| 5391472 | 10100100100010001110000 | 3 | 11 | −7 |
| 5423377 | 10100101100001000010001 | 3 | 15 | −7 |
| 5506243 | 10101000000010011000011 | 3 | 15 | −7 |
| 5534272 | 10101000111001001000000 | 3 | 11 | −7 |
| 5542336 | 10101001001001110000000 | 3 | 11 | −7 |
| 5580775 | 10101010101011111100111 | 3 | 15 | 5 |
| 5855487 | 10110010101011000111111 | 3 | 15 | 7 |
| 5959416 | 10110101110111011111000 | 3 | 11 | 7 |
| 6102774 | 10111010001111011110110 | 3 | 11 | 7 |
| 6393877 | 11000011000100000010101 | 3 | 15 | −7 |
| 6482184 | 11000101110100100001000 | 3 | 11 | −5 |
| 6863838 | 11010001011011111011110 | 3 | 11 | 7 |
| 7016379 | 11010110000111110111011 | 3 | 11 | 7 |
| 7043259 | 11010110111110000111011 | 3 | 11 | 7 |
| 7179951 | 11011011000111010101111 | 3 | 15 | 7 |
| 7207566 | 11011011111101010001110 | 3 | 15 | 7 |
| 7228335 | 11011100100101110101111 | 3 | 11 | 7 |
| 7245675 | 11011110001111101101011 | 3 | 15 | 7 |
| 7269135 | 11011110101101100001111 | 3 | 15 | 7 |
| 7272555 | 11011101111000110101011 | 3 | 11 | 7 |
| 7305402 | 11011110111000101111010 | 3 | 11 | 7 |
| 7305774 | 11011110111101001011110 | 3 | 11 | 7 |
| 7357522 | 11100000100010001010010 | 3 | 11 | −7 |
| 7598677 | 11100111110010010101001 | 3 | 15 | 5 |
| 7844956 | 11101111010100011011100 | 3 | 11 | 5 |
| 7891899 | 11110000110101110111011 | 3 | 15 | 7 |
| 7912410 | 11110001101110111010 | 3 | 11 | 7 |
| 7925466 | 11110001101110111011010 | 3 | 11 | 7 |
| 8042715 | 11110101011100011011011 | 3 | 15 | 7 |
| 8055099 | 11110101110100100111011 | 3 | 11 | 7 |
| 8116410 | 11110111101100010111010 | 3 | 15 | 7 |

TABLE 6-continued (n = 23)

| number | bj | max. corr. (forward) | max. corr. (backward) | dc level |
|---|---|---|---|---|
| 8116782 | 11110111101101000101110 | 3 | 11 | 7 |
| 8272746 | 11111100011101101101010 | 3 | 11 | 7 |
| 8302185 | 11111101010111001101001 | 3 | 15 | 7 |
| 8313066 | 11111101101100011101010 | 3 | 11 | 7 |
| 8359245 | 11111111000110101001101 | 3 | 15 | 7 |

TABLE 7

(n = 25)

| number | bj | max. corr. (forward) | max. corr. (backward) | dc level |
|---|---|---|---|---|
| 381638 | 0000001011101001011000110 | 3 | 11 | −5 |
| 446005 | 0000001101100111000110101 | 3 | 13 | −3 |
| 465770 | 0000001110001101101101010 | 3 | 13 | −3 |
| 473782 | 0000001110011101011010 | 3 | 13 | −1 |
| 897941 | 0000011011011001100010101 | 3 | 13 | −1 |
| 947565 | 0000011100111010101101101 | 3 | 15 | 1 |
| 2054758 | 0000111101011010100110010 | 3 | 13 | 1 |
| 2054886 | 0000111101011010111100110 | 3 | 11 | 3 |
| 3275446 | 0001100011111101011010 | 3 | 17 | 3 |
| 3672501 | 0001110000000100110110101 | 3 | 15 | −5 |
| 3672793 | 0001110000000101011011001 | 3 | 13 | −5 |
| 4808590 | 0010010010101111110001110 | 3 | 15 | 1 |
| 4945678 | 0010010110111011100001110 | 3 | 13 | 1 |
| 6550893 | 0011000111110101101101 | 3 | 13 | 5 |
| 6561626 | 0011001000001111101011010 | 3 | 11 | −1 |
| 6692698 | 0011001100001111101011010 | 3 | 13 | 1 |
| 7093738 | 0011011000011110111101010 | 3 | 11 | 3 |
| 7345602 | 0011100000001001101101 | 3 | 13 | −5 |
| 7345586 | 0011100000001010101101010 | 3 | 17 | −5 |
| 9609331 | 0100100101010000011100011 | 3 | 13 | −5 |
| 9610015 | 0100100101010001100011111 | 3 | 15 | −1 |
| 10178588 | 0100110110101000000011100 | 3 | 17 | −5 |
| 10805191 | 0101001001011111110000111 | 3 | 15 | 5 |
| 10950975 | 0101001110001100100111111 | 3 | 13 | 3 |
| 11297951 | 0101011000110010010011111 | 3 | 13 | 1 |
| 11374620 | 0101011011001000000011100 | 3 | 13 | −5 |
| 11383232 | 0101011011011000011000000 | 3 | 13 | −3 |
| 11499628 | 0101011101111000101101 | 3 | 11 | 3 |
| 11923532 | 0101101011111000001001100 | 3 | 11 | −1 |
| 11923660 | 0101101011111000011001100 | 3 | 13 | 1 |
| 13014848 | 0110001101001101010000 | 3 | 11 | −5 |
| 13197255 | 0110010010101111110000111 | 3 | 13 | 5 |
| 13415920 | 0110011001010101110000 | 3 | 13 | 1 |
| 13546992 | 0110011101011010111110000 | 3 | 11 | 3 |
| 14334400 | 0110110101110011100000 | 3 | 13 | −1 |
| 14335768 | 0110110101111110011000 | 3 | 17 | 3 |
| 14802340 | 0111000011101101010100 | 3 | 13 | 1 |
| 14939428 | 0111000111110101001000100 | 3 | 15 | 1 |
| 18615003 | 1000111000000101011011 | 3 | 15 | −1 |
| 18752091 | 1000111100001001011011 | 3 | 13 | −1 |
| 19218663 | 1001001010100000111000111 | 3 | 17 | −3 |
| 19220031 | 1001001010100011000111111 | 3 | 13 | 1 |
| 20007439 | 1001100010100011011 | 3 | 11 | −3 |
| 2013851 | 1001100110100101000001111 | 3 | 13 | −1 |
| 20357176 | 1001101010000001111000 | 3 | 13 | −5 |
| 20539583 | 1001110010110100010111111 | 3 | 11 | 5 |
| 21630771 | 1010010100001110011 | 3 | 13 | −1 |
| 21630899 | 1010010100001111110110011 | 3 | 11 | 1 |

TABLE 7-continued (n = 25)

| number | bj | max. corr. (forward) | max. corr. (backward) | dc level |
|---|---|---|---|---|
| 22054803 | 1010100001000011110010011 | 3 | 11 | −3 |
| 22171199 | 1010100100100111000111111 | 3 | 13 | 3 |
| 22179811 | 1010100100110111111100011 | 3 | 13 | 5 |
| 22256480 | 1010100111001101101100000 | 3 | 13 | −1 |
| 22603456 | 1010110001110011011000000 | 3 | 13 | −3 |
| 22749240 | 1010110110010000000111000 | 3 | 15 | −5 |
| 23375843 | 1011001001010111111100011 | 3 | 17 | 5 |
| 23944416 | 1011011010101100111000000 | 3 | 15 | 1 |

TABLE 8

(n = 27)

| number | bj | max. corr. (forward) | max. corr. (backward) | dc level |
|---|---|---|---|---|
| 930410 | 000000011100011001001101010 | 3 | 15 | −7 |
| 1624362 | 000000110001100100100101010 | 3 | 15 | −9 |
| 1860757 | 000000111000110010010010101 | 3 | 15 | −7 |
| 15798573 | 000111100010001000100101101 | 3 | 11 | −5 |
| 39566215 | 010010110111011101110000111 | 3 | 11 | 5 |
| 44341440 | 010101001001001100011000000 | 3 | 15 | −9 |
| 45245312 | 010101100100110001110000000 | 3 | 15 | −7 |
| 45534783 | 010101101101100111000111111 | 3 | 15 | 7 |

TABLE 9

(n = 29)

| number | bj | max. corr. (forward) | max. corr. (backward) | dc level |
|---|---|---|---|---|
| 11687143 | 00000101100100101010011100111 | 3 | 15 | −3 |
| 20815162 | 00001001111011001110100111010 | 3 | 15 | 1 |
| 29650650 | 00001110001000110111011011010 | 3 | 17 | −1 |
| 52082271 | 00011000110101011011001011111 | 3 | 15 | 3 |
| 52401586 | 00011000111111001010111011010 | 3 | 15 | 1 |
| 52417970 | 00011000011111101010110110010 | 3 | 11 | 3 |
| 69590574 | 00100001001011101111000101110 | 3 | 13 | 1 |
| 70752046 | 00100001101111001011100101110 | 3 | 19 | 1 |
| 79132430 | 00100101101110111011100001110 | 3 | 15 | 3 |
| 162536693 | 01001101100000001110011110101 | 3 | 15 | −1 |
| 162873112 | 01001101101010011111100011000 | 3 | 15 | 1 |
| 162889496 | 01001101101010111111100011000 | 3 | 11 | 3 |
| 169410125 | 01010000110001111111001001101 | 3 | 15 | 1 |
| 191808624 | 01011011011101100010001110000 | 3 | 17 | −1 |
| 194459536 | 01011100101110011011110010000 | 3 | 15 | 1 |
| 236838308 | 01110000111011101110110100100 | 3 | 15 | 3 |
| 244282500 | 01110100011110111010010000100 | 3 | 19 | −1 |
| 245185924 | 01110100111010011110110000100 | 3 | 19 | 1 |

TABLE 7-continued (n = 25)

| number | bj | max. corr. (forward) | max. corr. (backward) | dc level |
|---|---|---|---|---|
| 23945100 | 1011011010101111110001100 | 3 | 13 | 5 |
| 26208845 | 1100011111110101001001101 | 3 | 17 | 5 |
| 26209429 | 1100011111110110010010101 | 3 | 13 | 5 |
| 26460693 | 1100100111100001000010101 | 3 | 11 | −3 |
| 26861733 | 1100110011110000010100101 | 3 | 13 | −1 |
| 26992805 | 1100110111110000010100101 | 3 | 11 | 1 |
| 27003538 | 1100111000000101010010010 | 3 | 13 | −5 |
| 28608753 | 1101101001000100011110001 | 3 | 13 | −1 |
| 28745841 | 1101101101010000011100001 | 3 | 15 | −1 |
| 29881638 | 1110001111111010101001110 | 3 | 13 | 5 |
| 29881930 | 1110001111111011001001010 | 3 | 15 | 5 |
| 30278985 | 1110011100000101010010001 | 3 | 17 | −3 |
| 31499545 | 1110100000101001010011001 | 3 | 11 | −3 |
| 31499673 | 1110100000101001100011001 | 3 | 13 | −1 |
| 32606866 | 1111100011000101010010010 | 3 | 15 | −1 |
| 32656490 | 1111100100100110001101010 | 3 | 13 | 1 |
| 33080649 | 1111110001100010101001001 | 3 | 13 | 1 |
| 33088661 | 1111110001110010010010101 | 3 | 13 | 3 |
| 33108426 | 1111110010011000111001010 | 3 | 13 | 3 |
| 33172793 | 1111110100010110100111001 | 3 | 11 | 5 |

BEST MODE FOR CARRYING OUT THE INVENTION

Hereafter, modes for carrying out the present invention will be described by referring to FIGS. 1 through 23.

However, some modes hereafter described are shown in order to explain application examples for carrying out the present invention. Modes for carrying out the present invention are never limited to application examples described here.

Figure 1:
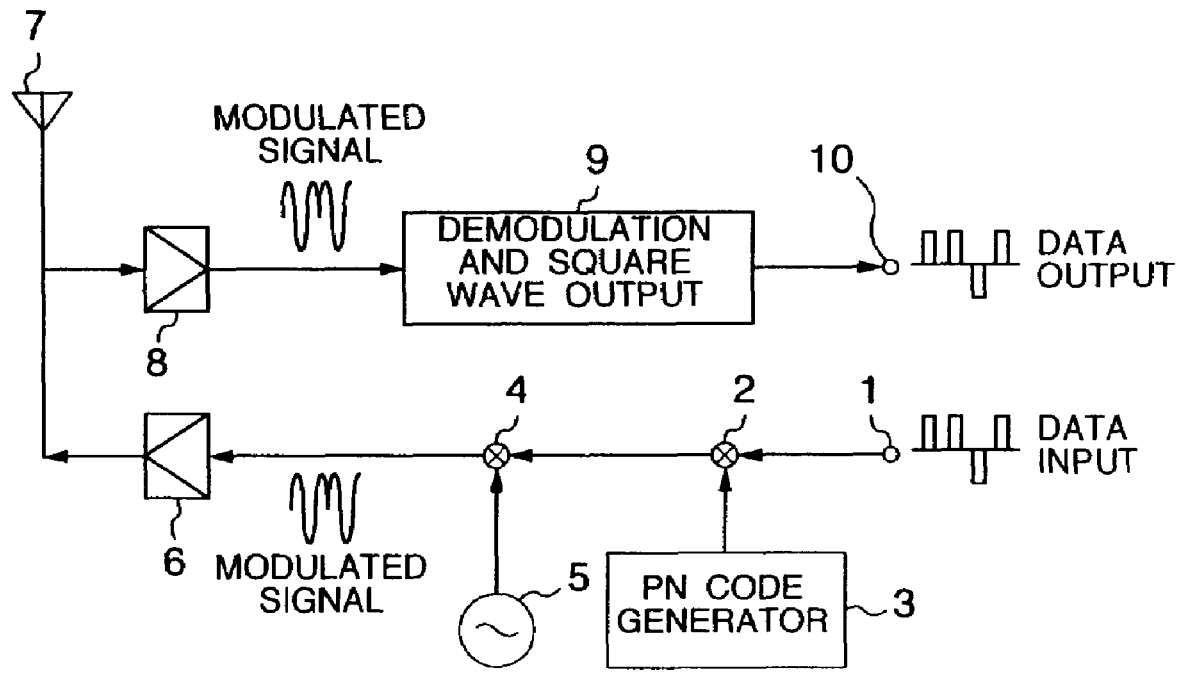
FIG. 1 is a system block diagram of a spread spectrum communication device showing a first application example of the present invention.

FIG. 1 is a diagram schematically showing a spread spectrum communication device to which the present invention has been applied. An information signal is inputted from an input terminal 1, multiplied in a mixer 2 by a signal supplied from a pseudo noise code generator 3, furthermore multiplied in a mixer 4 by a carrier supplied from an oscillator 5, amplified in an amplifier 6, and outputted from an antenna 7. Here, a code shown in TABLES 1 through 9 was used as the pseudo noise code.

Figure 2:
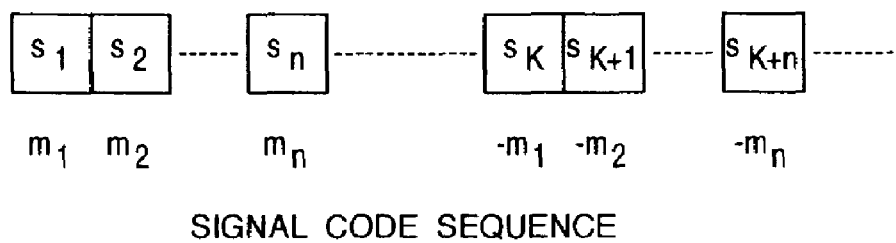
FIG. 2 is a diagram illustrating a signal code sequence.

In a receiving system, a signal inputted from the antenna 7 is amplified in an amplifier 8, demodulated, converted to a digital signal in a square wave output circuit 9, and taken out from an output terminal 10 as an information signal. Here, a code similar to the above described code was used as a reference code for demodulating the information. (It coincides with the pseudo noise code of the transmitter.) FIG. 2 is a diagram showing a signal code sequence. In the case of the synchronous detection system, a signal code sequence Sk corresponds to 1 and 0 of the information code, and it is represented as $$S_k = \begin{bmatrix} m_{mod(k/n)}(\text{data} = 1 \text{ or } 0) \\ -m_{mod(k/n)}(\text{data} = 0 \text{ or } 1) \end{bmatrix} \quad \text{(Expression 1)}$$

where mj (j=1, 2, . . . , n; n=code length) corresponds to a pseudo noise code bj shown in TABLES 1 through 9, and it is represented by the following equation.

$$m_j = \begin{bmatrix} 1(b_j = 1) \\ -1(b_j = 0) \end{bmatrix} \quad \text{(Expression 2)}$$

In the same way, in the case of the delay detection system, the signal code sequence Sk is represented by the following equation.

$$S_k = \begin{bmatrix} m_{mod(k/n)}S_{k-1}(\text{data} = 1 \text{ or } 0) \\ -m_{mod(k/n)}S_{k-1}(\text{data} = 0 \text{ or } 1) \end{bmatrix} \quad \text{(Expression 3)}$$

Denoting a reference code of the receiving side by Mj, a correlation coefficient Ok is represented by the following equation.

$$O_k = \sum_{j=1}^{n} S_{k+j-1}M_j \quad \text{(Expression 4)}$$

In the case where Mj=mj, the correlation coefficient Ok represents an auto-correlation coefficient and it is represented by the following equation.

$$O_k = \sum_{j=1}^{n} S_{k+j-1}m_j \quad \text{(Expression 5)}$$

Sub-peaks other than correlation peaks (mod(k/n)=1) are referred to as side lobes. As this value becomes smaller, the error rate of the receiver is typically reduced. For the case where the code length is at least 14, such a code that the side lobe value calculated by using the Expression 5 is 3 or less is shown in TABLES 1 through 9. Calculation conducted here corresponds to all arrangements (0, 0), (0, 1), (1, 0) and (1, 1) of 0 and 1 of the information code. (The above described 0 and 1 of the information code indicate that they are mutually in the relation of inverted code.) Calculation was conducted as to such an arrangement of Sk that signs whereby mj is multiplied are (+, +, −). That is, calculating to Expression 5 above is performed o a single code sequence $S_k$ which includes $M_{js}$ have signs (+,+,−), respectively (i.e., $S_k$=+$M_j$,+$M_j$−$M_j$). (In the remaining case where the signs are (−, −, +), a result equal in absolute value and opposite in sign to the above described result is obtained. In other words, only the polarity is different. Therefore, the above described calculation alone suffices.)

In TABLES 1 through 9, "bj" is a derived code sequence, and "number" is a value obtained by regarding the "bj" as a binary number and converting it to a decimal number.

Furthermore, "max corr. (forward)" is a side lobe value, and "max corr. (backward)" is a maximum value of correlation value obtained in the case where codes are reversed bilaterally. Furthermore, "dc level" is the sum total of n "mj"s. As a matter of course, similar results are obtained even if code inversion (1⇔0) is conducted on these codes. Since it takes an enormous time to conduct calculations, inverted codes are omitted for lengthy code lengths. If these codes are used as the pseudo noise code, there is obtained a spread spectrum communication device having a processing gain of at least 14 in auto-correlation side lobe, having smaller time-axis side lobes of received matched signal, having a smaller error rate, and having favorable characteristics.

Figure 3:
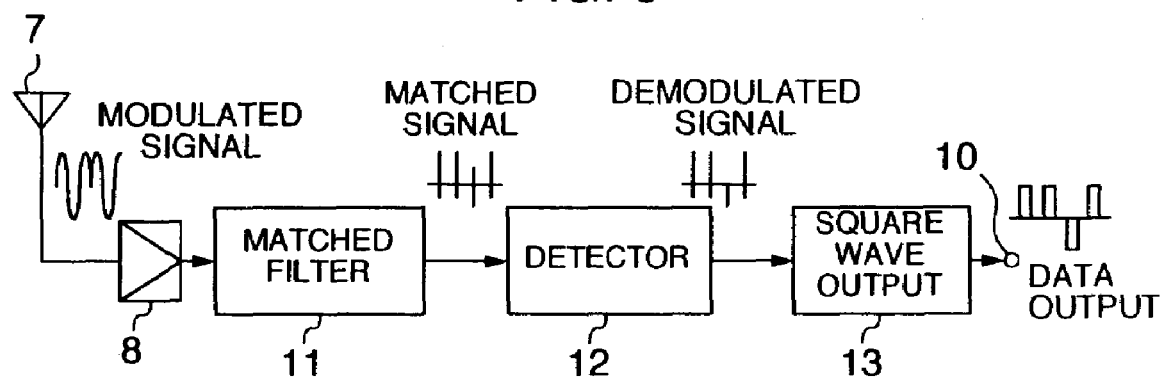
FIG. 3 is a system block diagram of a part of a communication device showing a second application example of the present invention.

A second application example of the present invention will now be described by referring to FIG. 3. The same components as those in FIG. 1 showing the first application example are denoted by like numerals. FIG. 3 is a diagram showing a receiving part of the second application example of the present invention. A received signal taken in from an antenna 7 is amplified in an amplifier 8, converted to a matched signal in a matched filter 11, detected in a detector circuit 12, demodulated, converted to a digital signal by a square wave output circuit 13, and outputted from an output terminal 10. In the present application example, a matched filter is used as a demodulating element. This results in a feature that the circuit can be simply formed.

A third application example of the present invention will now be described by referring to FIGS. 4 and 5.

Figure 4:
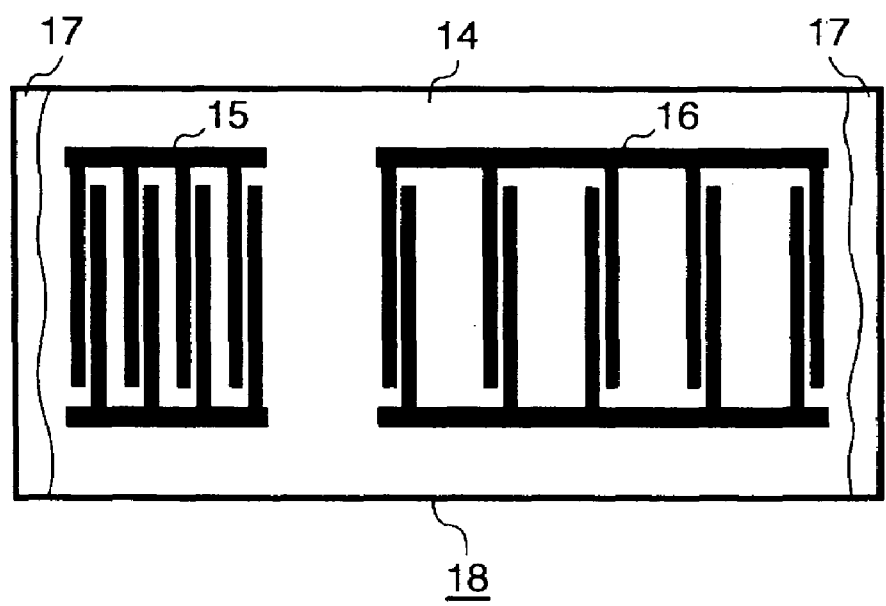
FIG. 4 shows a surface acoustic wave device using a second application example of the present invention.

FIG. 4 is a diagram schematically showing a SAW (surface acoustic wave) matched filter 18. On a SAW substrate 14, an input interdigital electrode set 15 and an output interdigital electrode set 16 are disposed. Furthermore, in order to suppress a reflected wave coming from a substrate face, a sound absorbing material 17 is coated. The input interdigital electrode set 15 has such a structure that the electrode polarity is inverted every electrode. (The electric polarity differs depending upon whether the electrode is connected to an upper common electrode or a lower common electrode.) The output interdigital electrode set 16 has a matched filter structure in which the electrode polarity is inverted in association with the pseudo noise code. As the substrate 14, an ST-cut crystal substrate is used in order to prevent the center frequency from being shifted due to the temperature.

Figure 5:
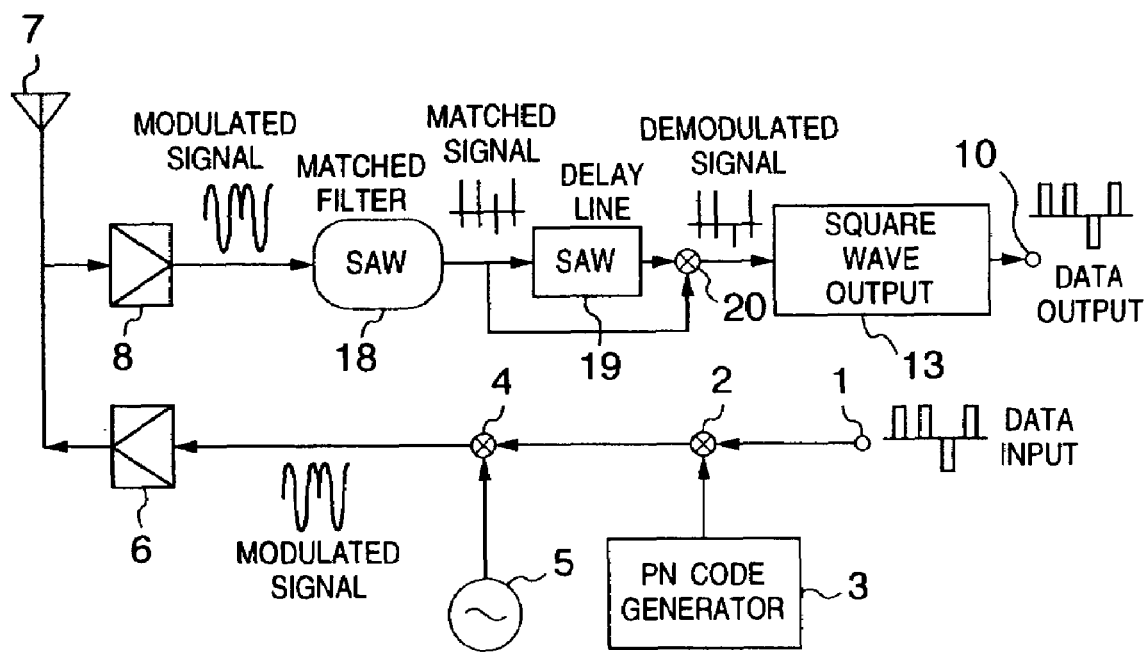
FIG. 5 is a system block diagram of a spread spectrum communication device showing a third application example of the present invention.

FIG. 5 is a system block diagram of the present application example. The same components as those in FIG. 1 showing the first application example are denoted by like numerals. A received signal taken in from an antenna 7 is amplified in an amplifier 8, converted to a matched signal in a SAW matched filter 18 of the present application example, multiplied in a mixer 20 by a signal preceding it by one information bit and delayed in a SAW delay line 19 and thus detected, converted in a square wave output circuit 13 to a digital signal, and outputted from an output terminal 10. In the present application example, delay detection is conducted by using an SAW element. This results in a feature that the detector circuit can be formed more simply.

Figure 6:
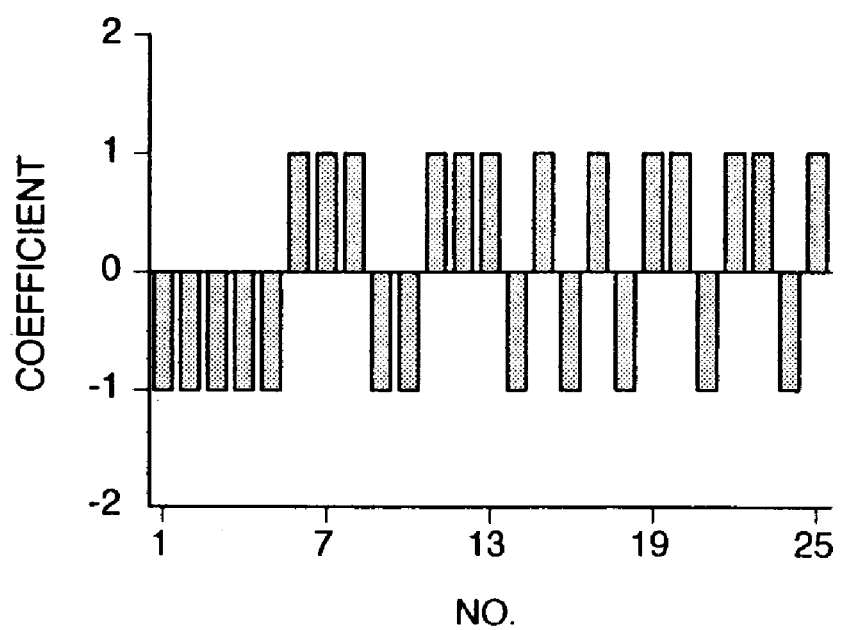
FIG. 6 shows a code sequence used in the third application example of the present invention.

FIG. 6 is a diagram showing mj corresponding to a 25-chip code bj of number (num) 947565 shown in TABLE 7.

Figure 7:
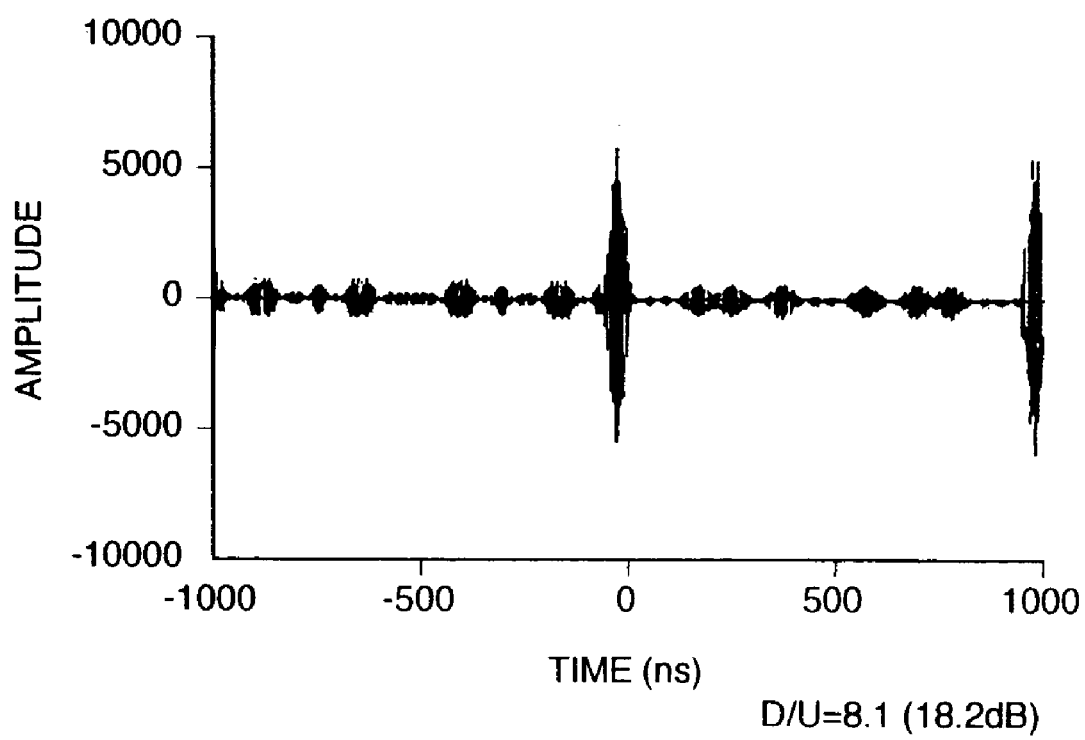
FIG. 7 shows a matched signal used in the third application example of the present invention.

FIG. 7 is a diagram showing a matched signal waveform in the case where this mj code is used on the transmitting side and the reference code of the matched filter on the receiving side is made the same. The carrier frequency is 300 MHz, and the information rate is 1 Mbps. At this time, a favorable side lobe suppression factor (peak to side lobe ratio D/U=18.2 dB) is obtained.

Figure 8:
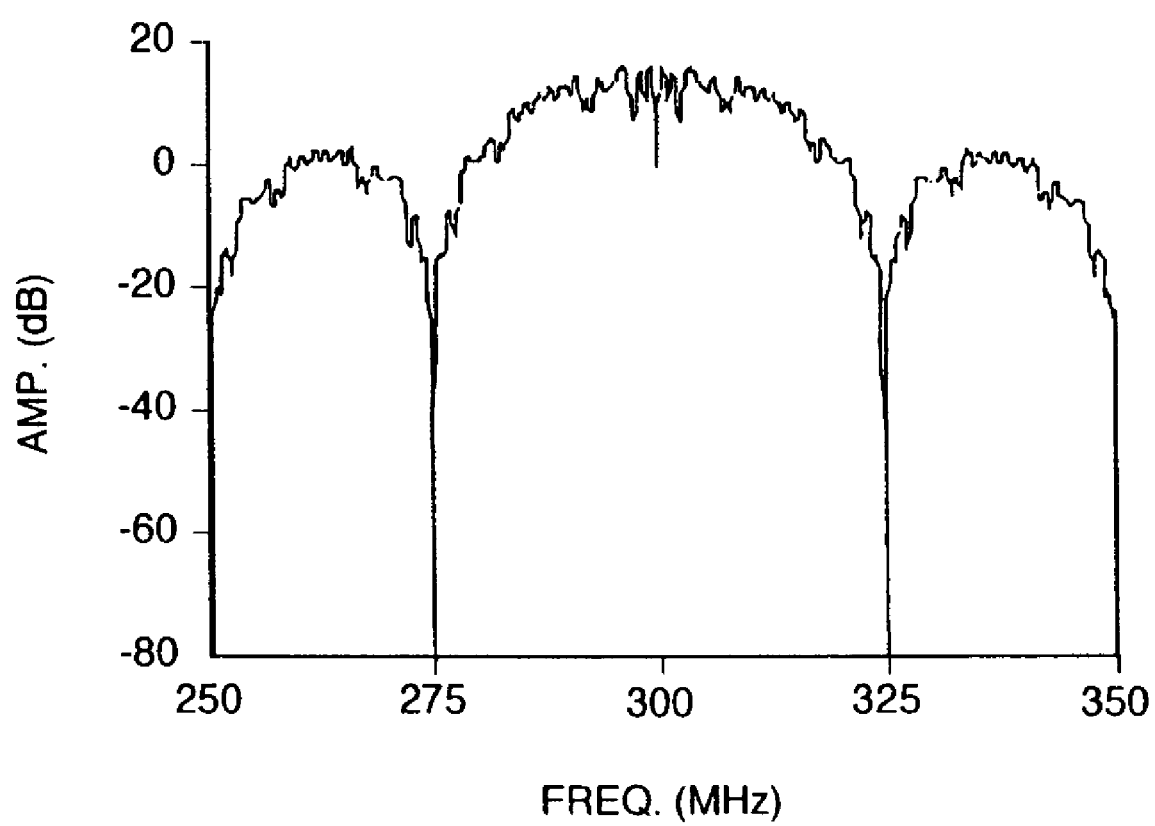
FIG. 8 shows the frequency response of a matched filter used in the third application example of the present invention.

FIG. 8 is a diagram showing the frequency response of the matched filter of the present application example. In FIG. 8, ripples on the frequency response correspond to side lobe deterioration. For the purpose of comparison, the case where the conventional 13-chip Barker code is used will now be also described.

Figure 9:
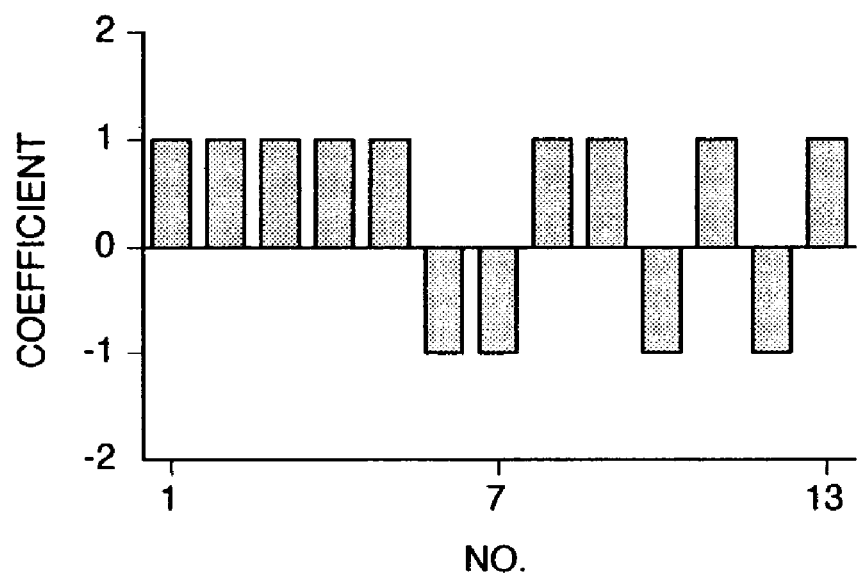
FIG. 9 shows a conventional Barker code (13 chips)

FIG. 9 is a diagram showing mj corresponding to this Barker code.

Figure 10:
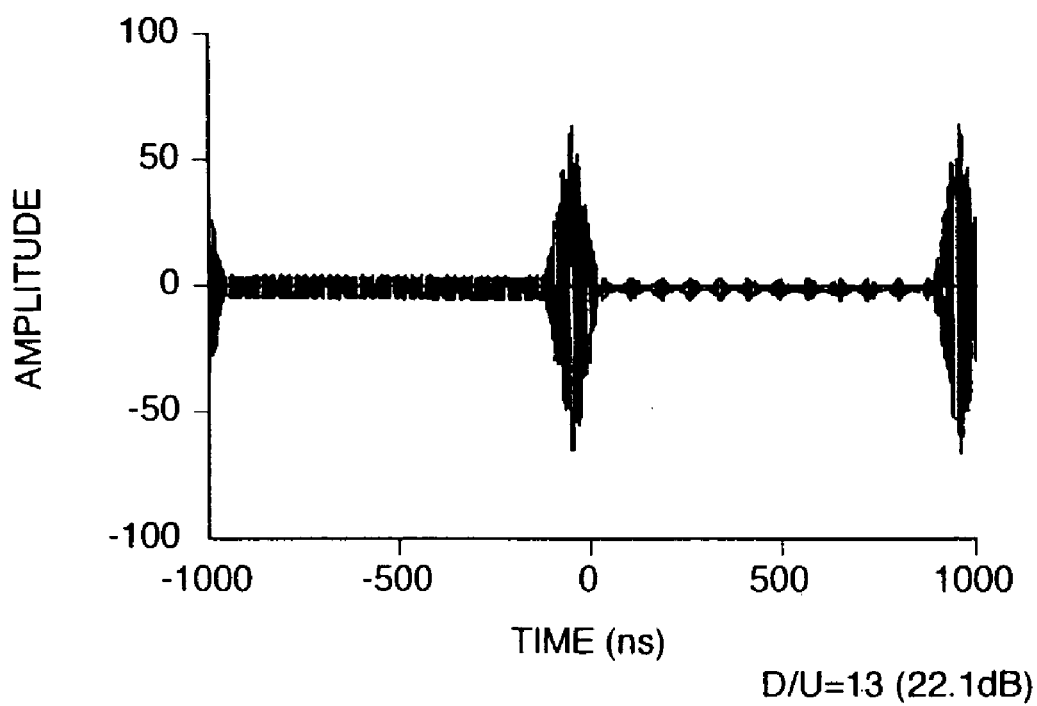
FIG. 10 shows a matched signal in the case where the conventional Barker code (13 chips) is used.

FIG. 10 is a diagram showing the matched signal waveform in the case where this mj code is used on the transmitting side and the reference code of the matched filter on the receiving side is made the same.

In the same way as the present application example, the carrier frequency was set equal to 300 MHz and the information rate was set equal to 1 Mbps. A side lobe suppression factor (peak to side lobe ratio D/U=22.1 dB) was obtained.

Figure 11:
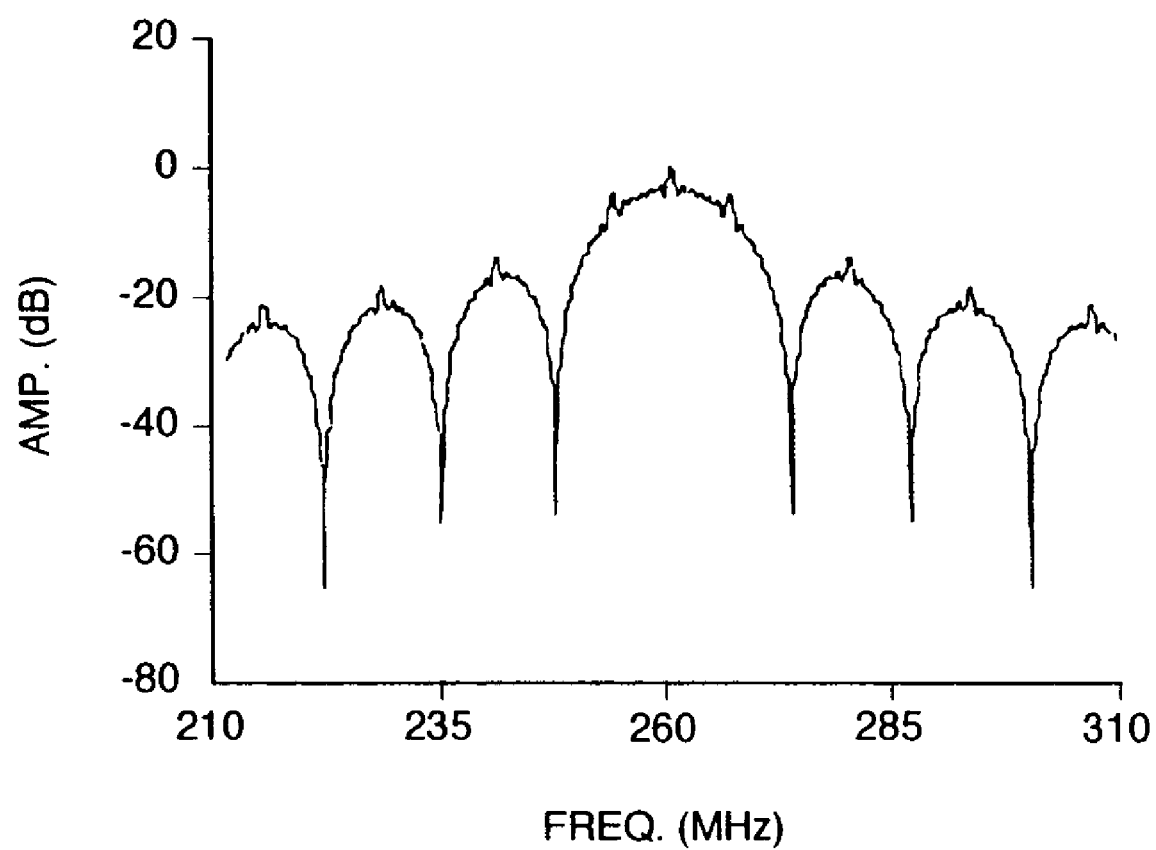
FIG. 11 shows the frequency response of a matched filter in the case where the conventional Barker code (13 chips) is used.

FIG. 11 is a diagram showing the frequency response of the matched filter in the case where the Barker code is used. It is shown that ripples are comparatively small and the side lobe suppression factor is large.

As described above, use of the present application example makes it possible to obtain a communication device having a chip length of 25 and improve significantly the processing gain at the sacrifice of only a slight side lobe deterioration as compared with the case where the conventional Barker code is used.

A fourth application example of the present invention will now be described by referring to FIGS. 12 and 13. In the above described third application example, the side lobe suppression factor was D/U=18.2 dB. In the present application example, however, further side lobe suppression is conducted.

Figure 12:
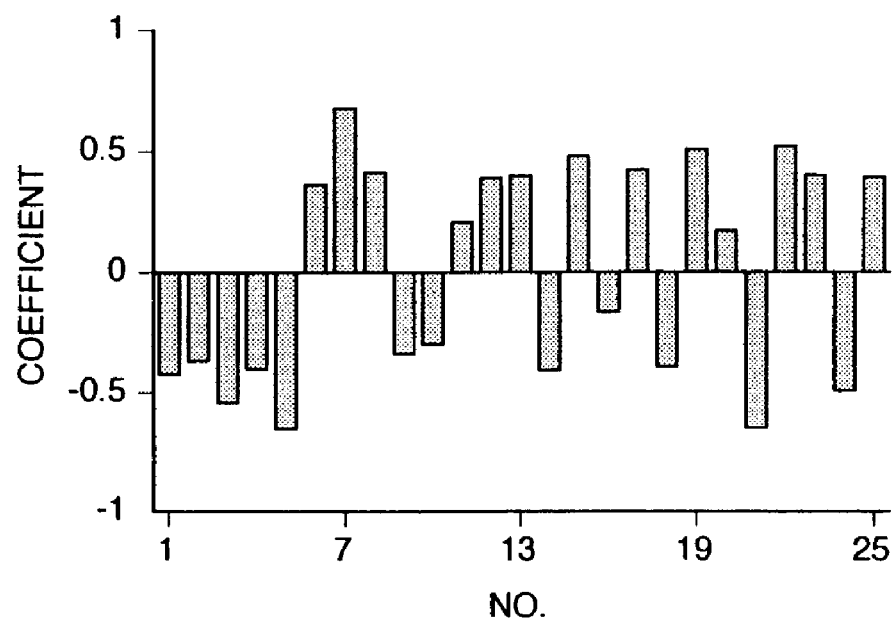
FIG. 12 shows tap coefficients of a matched filter using a fourth application example of the present invention.

FIG. 12 is a diagram showing a reference 25-chip tap coefficient Mj of the receiving side in the present application example. In order to conduct side lobe suppression of the matched signal, respective taps are provided with weights.

Figure 13:
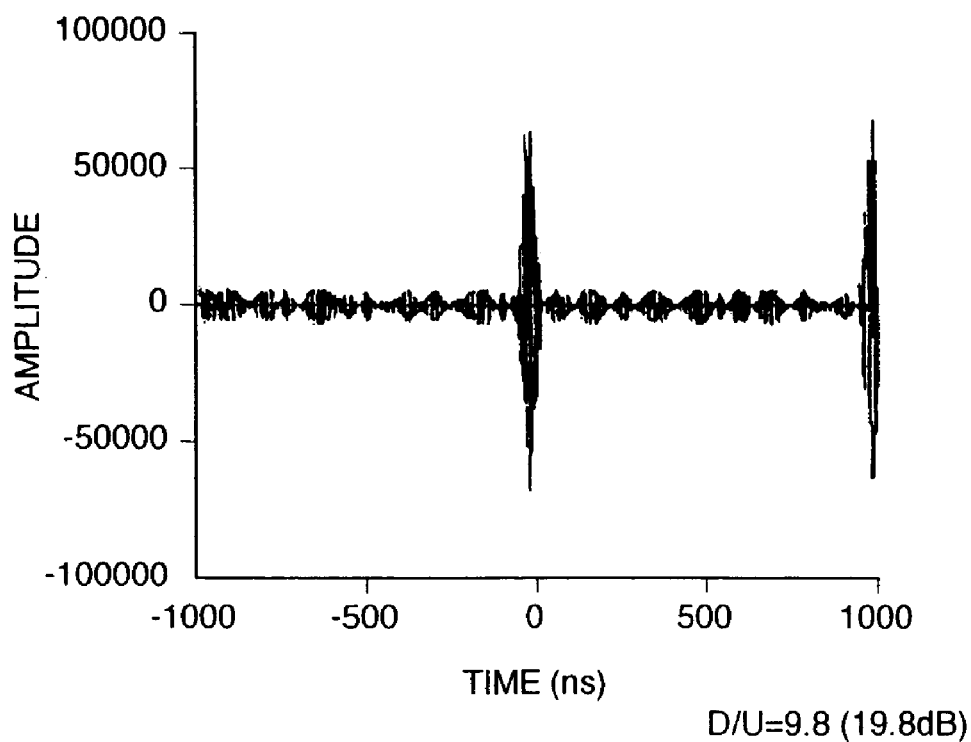
FIG. 13 shows a matched signal used in the fourth application example of the present invention.

FIG. 13 shows a matched signal waveform in the case where the mj code of the third application example are used on the transmitting side and respective taps of the matched filter of the receiving side are provided with weights corresponding to the above described reference code NJ. Coefficients of FIG. 12 were derived by using an optimization algorithm. The carrier frequency is 300 MHz, and the information rate is 1 Mbps. By doing so, a favorable side lobe suppression factor (peak to side lobe ratio D/U=19.8 dB) as compared with the third application example is obtained without increasing the number of taps of the receiving side.

A fifth application example of the present invention will now be described by referring to FIGS. 14 and 15. In the fourth application example, the number of taps was set equal to 25 equally for both the transmitting side and the receiving side. In the present application example, however, the number of taps on the receiving side was set equal to 49 in order to conduct further side lobe suppression.

Figure 14:
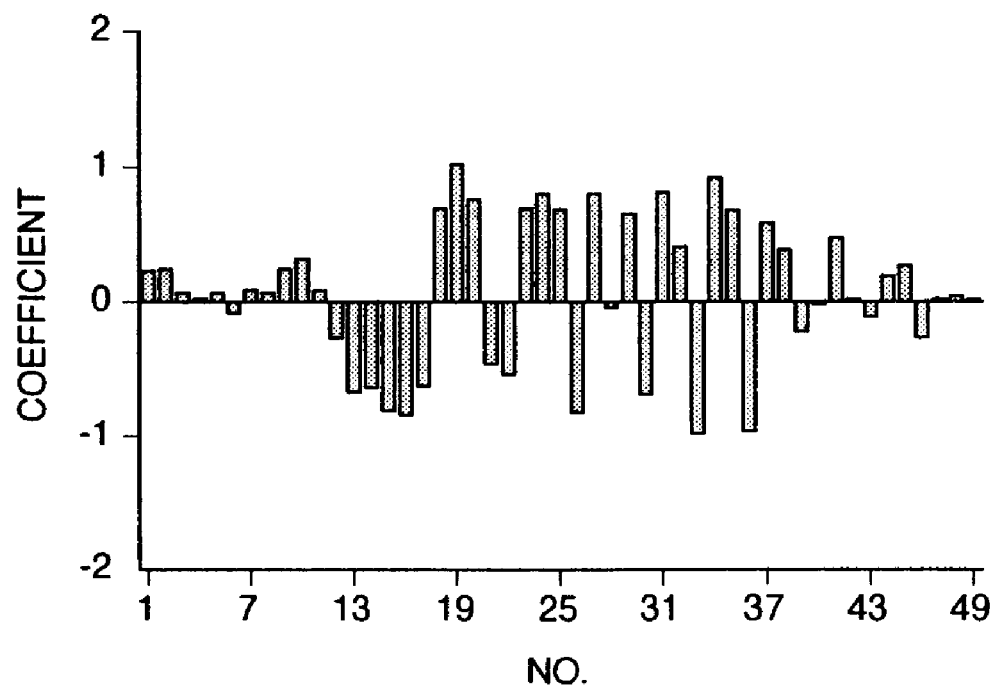
FIG. 14 shows tap coefficients of a matched filter using a fifth application example of the present invention.

FIG. 14 is a diagram showing the reference 49-chip tap coefficient NJ on the receiving side of the present application example. For matched signal side lobe suppression, respective taps are provided with weights.

Figure 15:
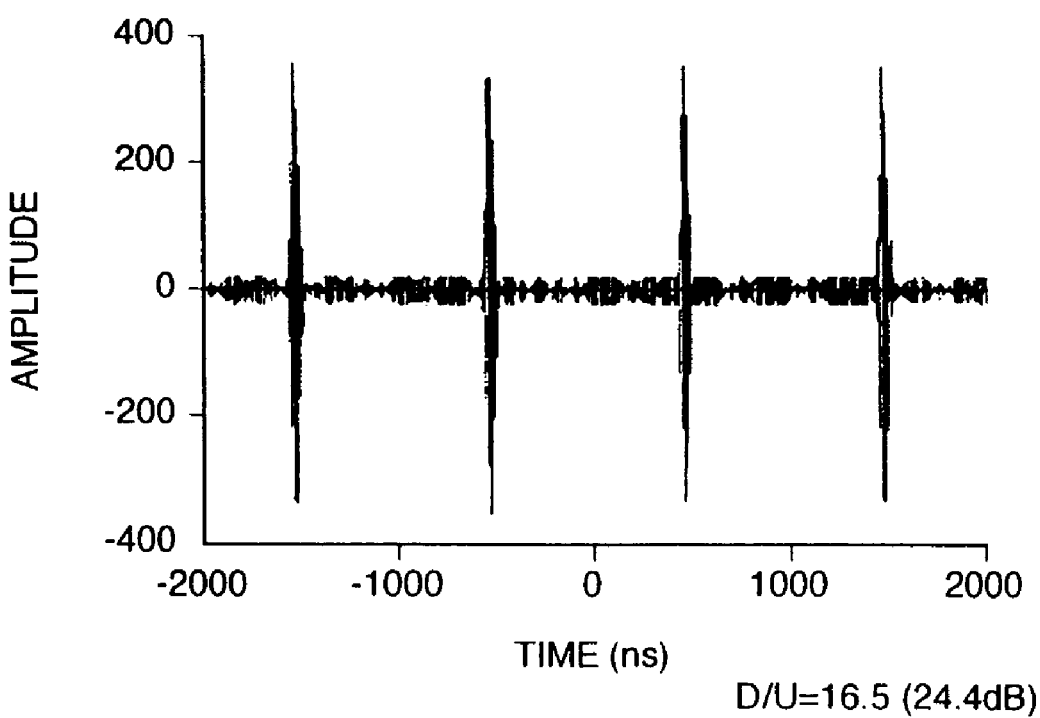
FIG. 15 shows a matched signal used in the fifth application example of the present invention.

FIG. 15 is a diagram showing a matched signal waveform in the case where the mj code of the third application example is used on the transmitting side and respective taps of the matched filter on the receiving side are provided with weights corresponding to the above described reference code MJ. Coefficients of FIG. 14 were derived by using the optimization algorithm. The carrier frequency is 300 MHz, and the information rate is 1 Mbps. As compared with the conventional case where the Barker code is used, a favorable side lobe suppression factor (peak to side lobe ratio D/tJ=24.4 dB) is obtained.

Figure 16:
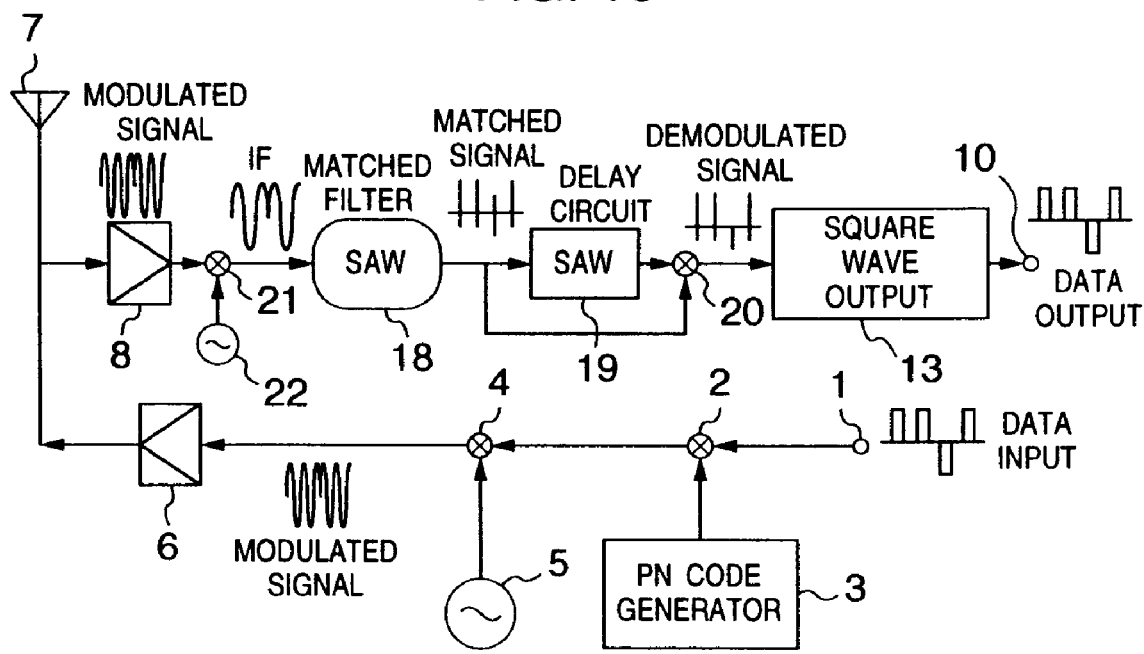
FIG. 16 is a system block diagram of a spread spectrum communication device showing a sixth application example of the present invention.

A sixth application example of the present invention will now be described by referring to FIG. 16. The same components as those in FIG. 5 showing the third application example are denoted by like numerals. In the third application example, demodulation is conducted directly in the transmission signal band. Since the frequency is high, however, signal processing is difficult in some cases. In the present application example, the frequency is lowered by multiplying the received signal with a signal generated by an oscillator 22 conducted in a mixer 21 and thereafter demodulation processing is conducted. If the present application example is used, demodulation processing with a comparatively low frequency band is possible, resulting in a feature of easy circuit design.

A seventh application example of the present invention will now be described by referring to FIG. 17.

Figure 17:
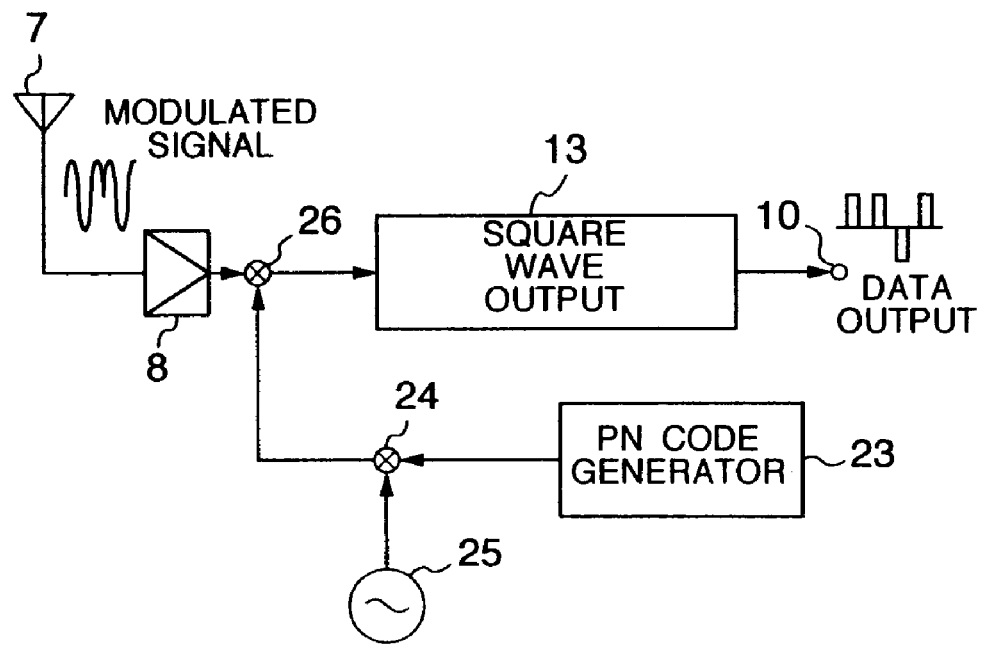
FIG. 17 is a system block diagram of a part of a communication device showing a seventh application example of the present invention.

FIG. 17 is a diagram showing a receiving part of a communication device in the seventh application example. The same components as those in FIG. 3 showing the second application example are denoted by like numerals. In the second application example, demodulation is conducted by using a matched filter. In the case where the information rate is slow, however, the device size of the matched filter becomes large. In the present application example, an signal outputted from a pseudo noise code generator 23 is multiplied in a mixer 24 by a carrier signal of an oscillator 25 having the same frequency as that of the carrier, and a resultant signal is synchronized with the received signal and it is multiplied in a mixer 26 by the received signal. As a result, a demodulated signal can be obtained. The present application example has a feature that signal demodulation can be conducted without increasing the device size even in the case where the information rate is comparatively slow.

An eighth application example of the present invention will now be described by referring to FIG. 18.

Figure 18:
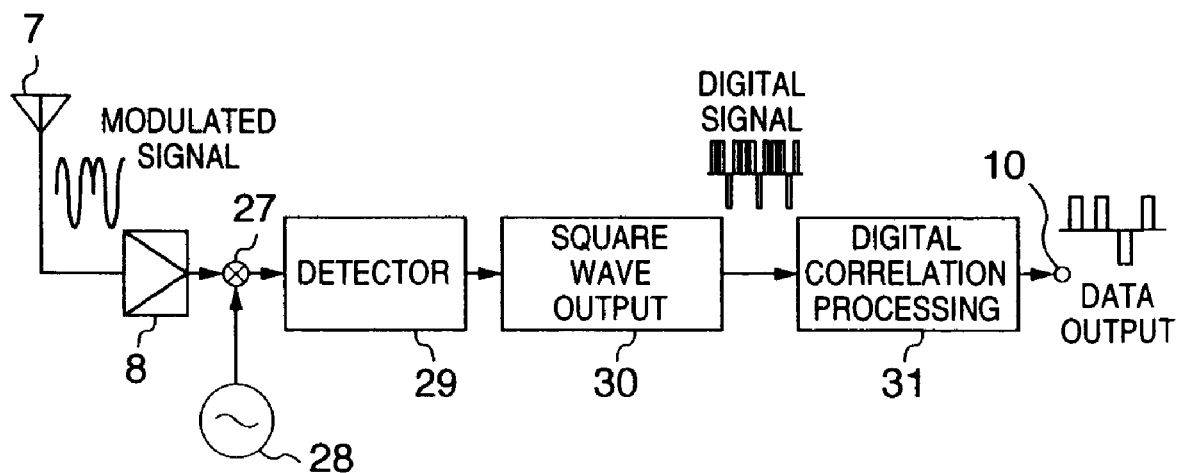
FIG. 18 is a system block diagram of a part of a communication device showing an eighth application example of the present invention.

FIG. 18 is a diagram showing a receiving part of a communication device in the eighth application example. The same components as those in FIG. 3 showing the second application example are denoted by like numerals. In the seventh application example, a pseudo noise signal is generated to conduct demodulation. On the receiver side as well, however, a signal generator is needed, resulting in a large circuit scale. In the present application example, a carrier frequency oscillator 28 is multiplied in a mixer 27 by the received signal. Furthermore, a resultant signal is converted to a digital signal by a detector circuit 29 and a square wave output circuit 30. In a digital correlation signal processing circuit 31, the digital signal is subjected to processing according to the equation of the Expression 4 and the equation of the Expression 5. In the present application example, correlation demodulation processing can be conducted by using digital processing. This results in a feature that the device can be fabricated at comparatively low cost in the case where the information rate is comparatively slow, or the pseudo noise code length is short.

A ninth application example of the present invention will now be described by referring to FIG. 19.

Figure 19:
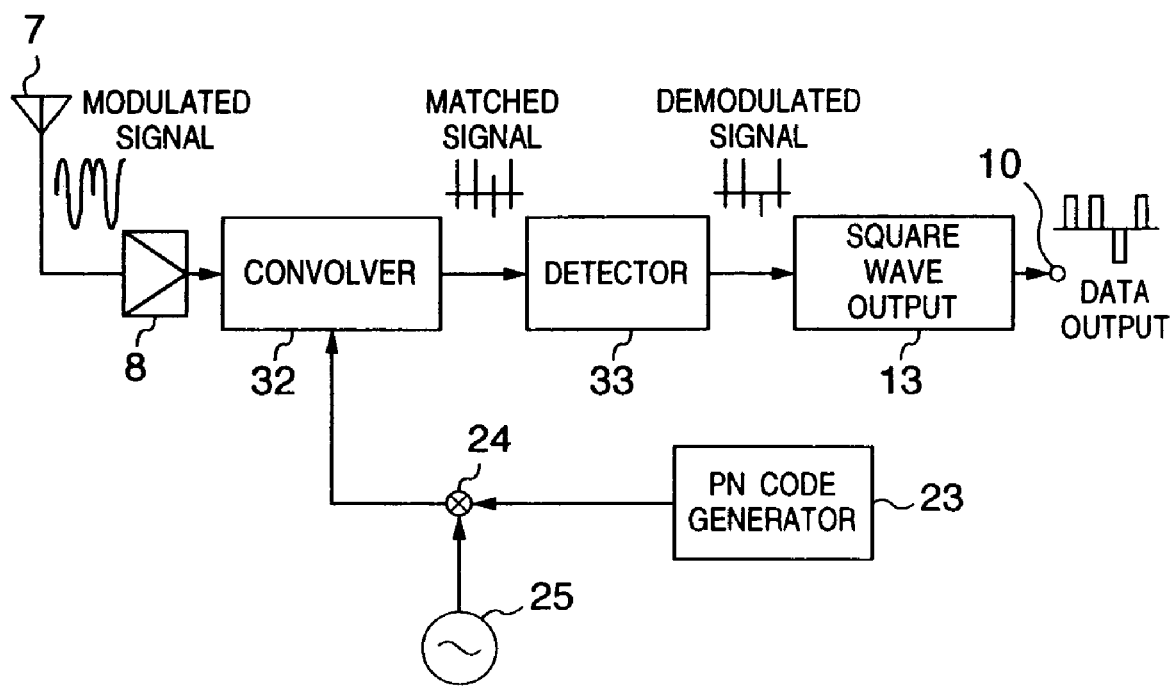
FIG. 19 is a system block diagram of a part of a communication device showing a ninth application example of the present invention.

FIG. 19 is a diagram showing a receiving part of a communication device in the ninth application example. The same components as those in FIG. 17 showing the seventh application example are denoted by like numerals. In the eighth application example, demodulation is conducted in the digital circuit. In the case where the information rate is fast and the pseudo noise code length is long, processing cannot be conducted in some oases because the clock frequency of the digital circuit is low. In the present application example, a signal outputted from a pseudo noise code generator 23 is multiplied in a mixer 24 by a carrier signal of an oscillator 25 having the same frequency as the carrier. A resultant signal and the received signal are subjected to convolution integral processing in a convolver 32 which is a correlation element. Furthermore, a resultant signal is subjected to demodulation in a detector circuit 33. The present application example has a feature that the demodulated signal can be obtained comparatively easily so long as the carrier frequency can be synchronized with the pseudo noise code cycle even in the case where the information rate is fast and the pseudo noise code length is long.

As compared with the sixth through ninth application examples, the case where the matched filter is used as in the second and third application examples has a feature that signal synchronizing is unnecessary because the code on the receiving side is fixed. On the contrary, the sixth through ninth application examples have a feature that the reference code on the receiving side can be changed freely so as to correspond to the code on the transmitting side because the code is variable.

A tenth application example of the present invention will now be described by referring to FIG. 20.

Figure 20:
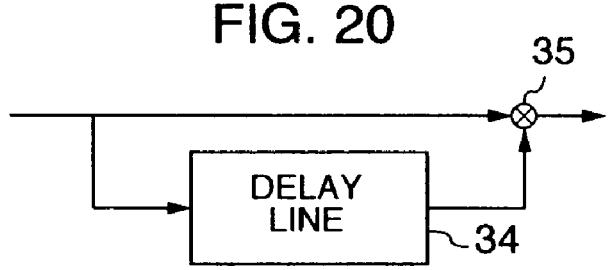
FIG. 20 is a system block diagram of a part of a communication device showing a tenth application example of the present invention.

FIG. 20 is a diagram showing a detection part of a communication device in the tenth application example. In the present application example, a delay detection system is used as the detection system, and demodulation is conducted by multiplying a current signal, in a mixer 35, by a signal preceding a current signal by one information bit supplied from a delay line 34. In the present application example, the detector circuit can be simplified.

An eleventh application example of the present invention will now be described by referring to FIG. 21.

Figure 21:
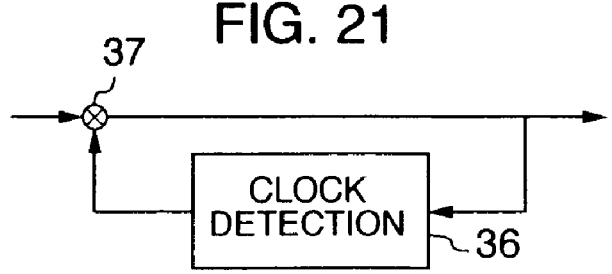
FIG. 21 is a system block diagram of a part of a communication device showing an eleventh application example of the present invention.

FIG. 21 is a diagram showing a detection part of a communication device of the eleventh application example. In the present application example, a synchronous detection system is used as the detection system, and demodulation is conducted by multiplying a clock reproduced by a clock detection circuit 36, in a mixer 35, by a signal. In the present application example, a better error rate than that of the delay detection system is obtained.

Figure 22:
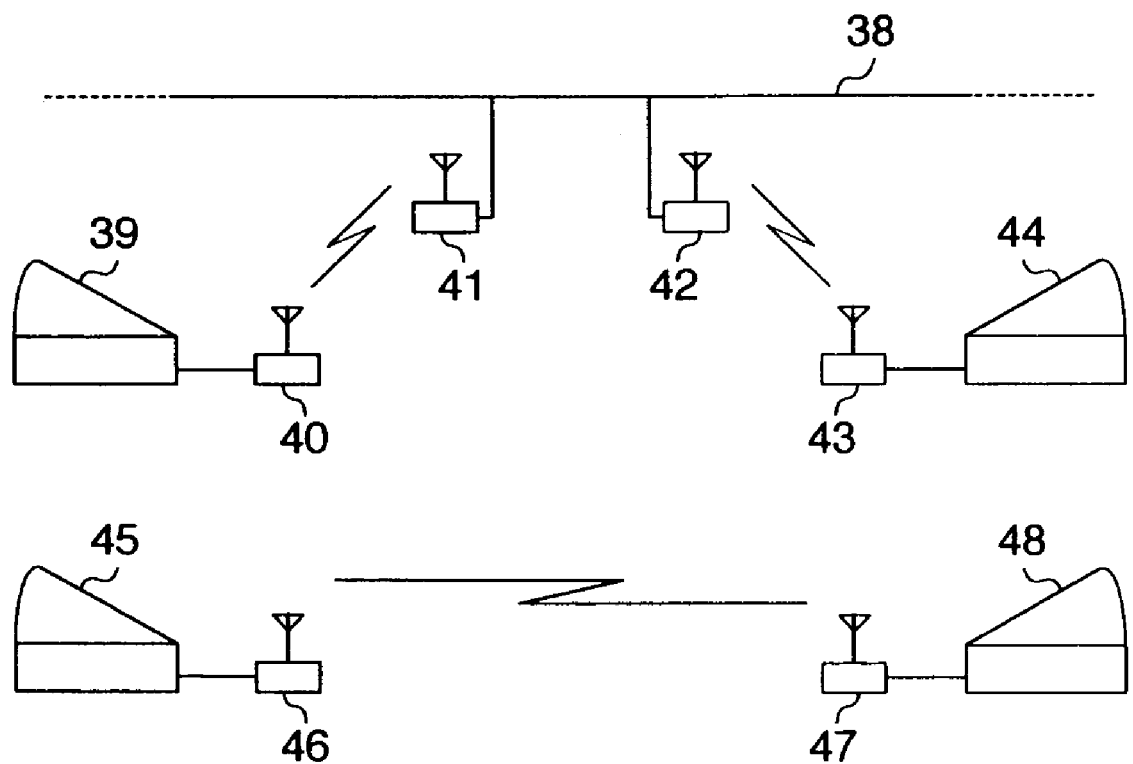
FIG. 22 shows a communication system using a device shown in a twelfth application example of the present invention.

A twelfth application example of the present invention will be now described by referring to FIG. 22.

FIG. 22 is a diagram showing a communication system of the twelfth application example. In the present application example, communication devices of the present system are used in a LAN. Present communication devices 41 and 42 are connected to a LAN cable 38. Present communication devices 40 and 43 are connected to terminals 39 and 44. Present communication devices 46 and 47 are connected to terminals 45 and 48. Between terminals (without a wire system between), communication can be conducted freely. If the present application example is used, it is not necessary to connect each terminal to a LAN cable, and consequently terminals can be freely moved.

INDUSTRIAL APPLICABILITY

According to the present invention, the side lobes of the correlation coefficient can be suppressed with the pseudo noise code length of at least 14 as heretofore described. Therefore, the error rate can be reduced and the processing gain can be improved in a spread spectrum communication device and a communication system using the spread spectrum communication device.

What is claimed is:

1. A spread spectrum communication receiver comprising: a receiver which receives a signal using a pseudo noise code from a transmitter; and a matched filter which has taps, each tap having a weight, wherein said transmitter has a pseudo noise code generator for generating, as said pseudo noise code, a code sequence having a code length of at least 14 and having a value corresponding to a peak of one of plural absolute auto-correlation side lobes having a smallest value, which is calculated such that in a synchronous detection system, a signal code sequence Sk corresponds to 1 and 0 of an information signal and is represented by the following equation:

$$S_k = \begin{bmatrix} m_{mod(k/n)}(\text{data} = 1 \text{ or } 0) \\ -m_{mod(k/n)}(\text{data} = 0 \text{ or } 1) \end{bmatrix} \quad \text{(Expression 1)}$$

wherein $m_j$ (j=1, 2, ..., n; n=code length) corresponds to one of the pseudo noise codes $b_j$ as represented by the following equation:

$$m_j = \begin{bmatrix} 1(b_j = 1) \\ -1(b_j = 0) \end{bmatrix} \quad \text{(Expression 2)}$$

wherein in a delay detection system, the signal code sequence $S_k$ is represented by the following equation:

$$S_k = \begin{bmatrix} m_{mod(k/n)}S_{k-1}(\text{data} = 1 \text{ or } 0) \\ -m_{mod(k/n)}S_{k-1}(\text{data} = 0 \text{ or } 1) \end{bmatrix} \quad \text{(Expression 3)}$$

wherein a reference code of a receiving side is denoted by $M_j$, and a correlation coefficient $O_k$ is represented by the following equation:

$$O_k = \sum_{j=1}^{n} S_{k+j-1} M_j \quad \text{(Expression 4)}$$

in a case where $M_j = m_j$, and the correlation coefficient $O_k$ represents an auto-correlation coefficient which is represented by the following equation:

$$O_k = \sum_{j=1}^{n} S_{k+j-1} M_j \quad \text{(Expression 5)}$$

wherein sub-peaks other than correlation peaks (mod(k/n)≠1) are referred to as side lobes; and wherein said value of said peak of the one of the absolute auto-correlation side lobes having the smallest value refers to the highest point of said one of the absolute auto-correlation side lobes.

2. A spread spectrum communication receiver according to claim 1, wherein each tap has a coefficient and said coefficient is derived by using an optimization algorithm for peak to side lobe ratio.

3. A spread spectrum communication receiver according to claim 1, wherein the number of taps on the receiver is larger than code length.

4. A spread spectrum communication receiver according to claim 1, wherein a code length of said pseudo noise code is at least 14 and is an odd number.

5. A spread spectrum communication receiver according to claim 1, wherein a code length of said pseudo noise code is 15, 21, 25 or 27.

6. A spread spectrum communication receiver according to claim 1, wherein said spread spectrum communication receiver has a filter function for demodulating a received signal and reducing side lobes of an obtained output matched signal.

7. A spread spectrum communication receiver according to claim 1, wherein said matched filter is used as a demodulating element for demodulating a received signal.

8. A spread spectrum communication receiver according to claim 1, wherein said pseudo noise code is multiplied by a high frequency carrier, and a resultant signal is mixed with a received signal to conduct demodulating of said received signal.

9. A spread spectrum communication receiver according to claim 1, wherein demodulation processing is conducted by using a correlation element for conducting correlation processing between a signal obtained by multiplying said pseudo noise code by a high frequency carrier and a received signal.

10. A spread spectrum communication receiver according to claim 1, wherein the delay detection system is used as a system for detecting a demodulated received signal.

11. A spread spectrum communication receiver according to claim 1, wherein the synchronous detection system is used as a system for detecting a demodulated received signal.

* * * * *